(12) United States Patent
Moon

(10) Patent No.: US 11,412,148 B2
(45) Date of Patent: Aug. 9, 2022

(54) METHOD OF IMPROVING IMAGE QUALITY IN ZOOM SCENARIO WITH SINGLE CAMERA, AND ELECTRONIC DEVICE INCLUDING THE SAME

(71) Applicant: Samsung Electronics Co., Ltd., Suwon-si (KR)

(72) Inventor: Sangmin Moon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/145,206

(22) Filed: Jan. 8, 2021

(65) Prior Publication Data

US 2021/0218898 A1 Jul. 15, 2021

(30) Foreign Application Priority Data

Jan. 10, 2020 (KR) ........................ 10-2020-0003819

(51) Int. Cl.
*H04N 5/232* (2006.01)
*H04N 5/235* (2006.01)

(52) U.S. Cl.
CPC ....... *H04N 5/23296* (2013.01); *H04N 5/2351* (2013.01); *H04N 5/23229* (2013.01); *H04N 5/23245* (2013.01); *H04N 5/232935* (2018.08)

(58) Field of Classification Search
CPC ............. H04N 5/23296; H04N 5/2351; H04N 5/23245; H04N 5/232935; H04N 5/23229;

(Continued)

(56) References Cited

U.S. PATENT DOCUMENTS 8,558,915 B2 * 10/2013 Morimoto ............ H04N 5/3456
348/230.1
2006/0061677 A1 3/2006 Yoshida
(Continued)

FOREIGN PATENT DOCUMENTS

JP 2014-064323 A 4/2014
KR 10-1643773 B1 7/2016

OTHER PUBLICATIONS

International Search Report dated Apr. 29, 2021 in connection with International Patent Application No. PCT/KR2021/000262, 4 pages.
(Continued)

*Primary Examiner* — Luong T Nguyen

(57) ABSTRACT

The disclosure relates to an electronic device (e.g., a camera) for improving image quality in a zoom scenario, and a control method thereof. The electronic device may display a preview image including an image generated from information acquired through the image sensor, perform a zoom-in operation or a zoom-out operation for the preview image, determine whether it is necessary to change an output mode of the image sensor in response to the zoom-in or the zoom-out operation, and generate an Inter-Integrated Circuit (I2C) instruction for changing the output mode of the sensor. Upon determining that it is necessary to change the output mode of the image sensor, control the sensor to change the output mode of the sensor by executing the generated I2C instruction while the image sensor maintains an active state, and change a sensor index recorded in a register to have access to information on a sensor mode.

20 Claims, 14 Drawing Sheets

(58) Field of Classification Search
CPC ............... H04N 5/232; H04N 5/23216; H04N 5/23258; H04N 5/23287; H04N 5/232933; H04N 9/04557; H04N 5/343; H04N 21/2351
See application file for complete search history.

(56) References Cited

U.S. PATENT DOCUMENTS

| | | | |
|---|---|---|---|
| 2013/0135499 A1* | 5/2013 | Song | H04N 5/23245 348/240.99 |
| 2013/0222648 A1 | 8/2013 | Yoneda et al. | |
| 2014/0198237 A1 | 7/2014 | Noyes | |
| 2015/0070530 A1* | 3/2015 | Tanaka | H04N 5/772 348/231.99 |
| 2016/0086309 A1* | 3/2016 | Hsu | G06T 3/4015 382/162 |
| 2016/0191812 A1* | 6/2016 | Tsubusaki | H04N 5/232945 348/240.1 |
| 2017/0299842 A1* | 10/2017 | Posa | G02B 7/06 |
| 2018/0152611 A1 | 5/2018 | Li et al. | |
| 2019/0037143 A1* | 1/2019 | Tsubusaki | H04N 5/23245 |

OTHER PUBLICATIONS

Written Opinion of the International Searching Authority dated Apr. 29, 2021 in connection with International Patent Application No. PCT/KR2021/000262, 4 pages.

\* cited by examiner

METHOD OF IMPROVING IMAGE QUALITY IN ZOOM SCENARIO WITH SINGLE CAMERA, AND ELECTRONIC DEVICE INCLUDING THE SAME

CROSS-REFERENCE TO RELATED APPLICATION

This application is based on and claims priority under 35 U.S.C. § 119 to Korean Patent Application No. 10-2020-0003819 filed on Jan. 10, 2020 in the Korean Intellectual Property Office, the disclosure of which is herein incorporated by reference in its entirety.

BACKGROUND

1. Field

The disclosure relates to an electronic device (e.g., a camera) for improving image quality in a zoom scenario.

2. Description of Related Art

An electronic device may acquire a picture or an image by using one or a plurality of cameras. There are many recent cases in which the plurality of cameras are applied to the electronic device to improve the quality of the picture or image. For example, the plurality of cameras may be mounted respectively on different faces and used to capture images in different directions. The plurality of cameras may be mounted on the same face of the electronic device and used when providing an image acquired by synthesizing captured images in the same direction. However, a low-cost device may not be equipped with the plurality of cameras due to a cost issue.

An electronic device which captures an image by using a digital camera may display a preview image to provide a live image stream acquired by using the digital camera so that a user can identify an image to be captured. In addition, the electronic device may perform a zoom-in operation which enlarges an image to be captured by using a camera or a zoom-out operation which captures an image for a wider range by reducing the image. In the case of a mobile electronic device, a trend of a small-sized electronic device makes it difficult to secure a space in which an optical lens moves back and forth to perform an optical zoom. Therefore, a digital zoom which changes a magnification of an image may be performed through signal processing of digital images. However, in the case of a digital zoom, image quality may deteriorate with an increase in the magnification. In order to acquire an image with an increased magnification while reducing the deterioration in the image quality, a tele lens and a wide-angle lens may be selectively used according to the magnification. However, when an additional tele camera is provided in the mobile electronic device (e.g., a camera, a smartphone, a tablet personal computer (PC)), there is an increase in cost for producing the mobile electronic device. In addition, since a plurality of camera modules may have to operate, current consumption may also increase. A complex software technology may be required to switch a tele camera and a wide camera in digital zoom-in and zoom-out operations.

Alternatively, a sensor having an output mode that supports a normal resolution and a high resolution in one sensor may be used to switching the output mode of the sensor according to a zoom magnification. However, due to a structure of an Image Signal Processor (ISP), an output of the sensor is transmitted after configuring the sensor such that the output of the image sensor is deactivated and then the output of the sensor is activated in the changed output mode. There is a problem in that a preview stops when the mode is changed due to a delay which occurs while the sensor is deactivated to handle this process.

Technical problems this disclosure addresses are not limited to the ones mentioned above, and other technical problems not mentioned herein can be understood by those skilled in the art to which the disclosure pertains from the following descriptions.

SUMMARY

According to various embodiments, an electronic device may include a display, an image sensor, and at least one processor. The at least one processor may be configured to display a preview image including an image generated from information acquired through the image sensor, perform a zoom-in operation or zoom-out operation for the preview image, determine whether it is necessary to change an output mode of the image sensor in response to the zoom-in operation or the zoom-out operation, generate an Inter-Integrated Circuit (I2C) instruction which allows to change the output mode of the sensor, upon determining that it is necessary to change the output mode of the image sensor, control the sensor to change the output mode of the sensor by executing the generated I2C instruction while the image sensor maintains an active state, and change a sensor index recorded in a register to have access to information on a sensor mode which is currently in use, in response to the change of the output mode. Upon determining that it is necessary to change the output mode of the image sensor, an update may be skipped for a second frame which is at least one of frames next to a first frame which is a frame of the preview image corresponding to a timing of determining that it is necessary to change the output mode of the image sensor. The executing of the I2C instruction may be complete within a duration in which the second frame is not updated.

An electronic device according to various embodiments disclosed in this document can improve image quality of an image of which a magnification is changed by a zoom-in or zoom-out operation. In addition, the electronic device according to various embodiments can acquire a zoomed-in preview image with improved image quality without having to use an additional physical camera. Therefore, the electronic device according to various embodiments disclosed in this document can control a sensor with a simple Software (SW) technology.

The electronic device according to various embodiments can change a sensor mode without a sense of discomfort because there is no delay when the sensor mode is switched. In addition, since the electronic device according to various embodiments does not have a separate tele camera, there is no problem of an increase in unit cost, current consumption, or the like.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

BRIEF DESCRIPTION OF THE DRAWINGS

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
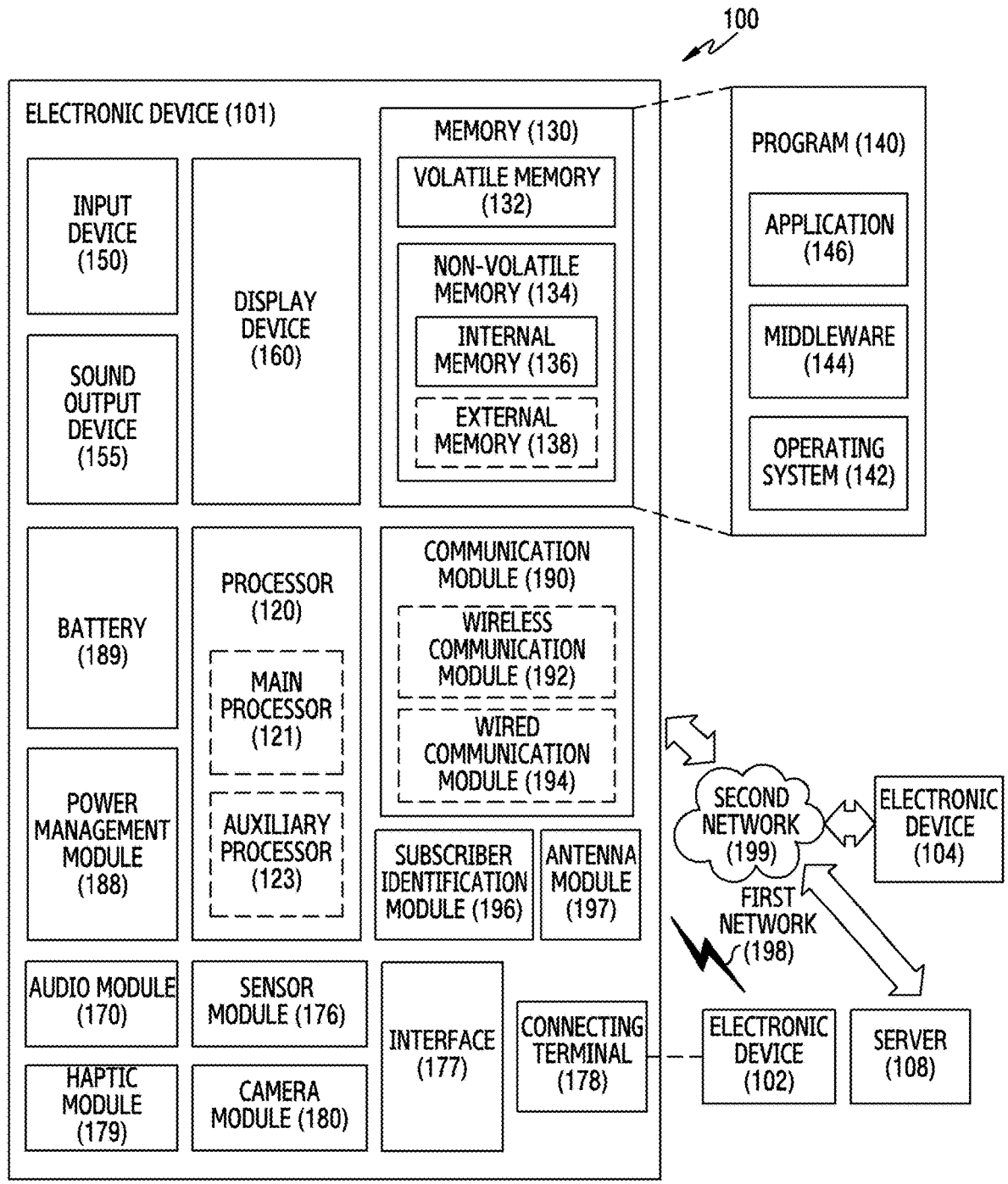
FIG. 1 illustrates a block diagram of an electronic device in a network environment, according to various embodiments.

FIG. 1 illustrates a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module(SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all, or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above. It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor(e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server. According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
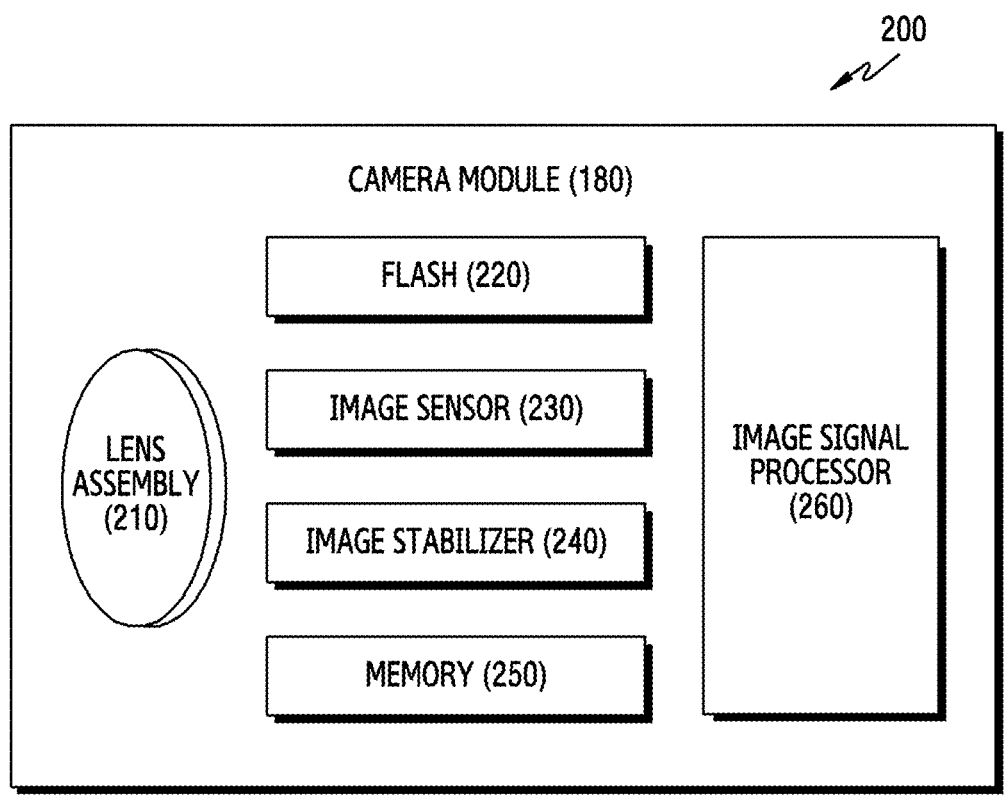
FIG. 2 illustrates a block diagram of a camera module, according to various embodiments.

FIG. 2 illustrates a block diagram 200 illustrating the camera module 180 according to various embodiments.

Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules180 may form a telephoto camera. Similarly, at least one of the plurality of camera modules 180 may form, for example, a front camera and at least another of the plurality of camera modules180 may form a rear camera.

Figure 3:
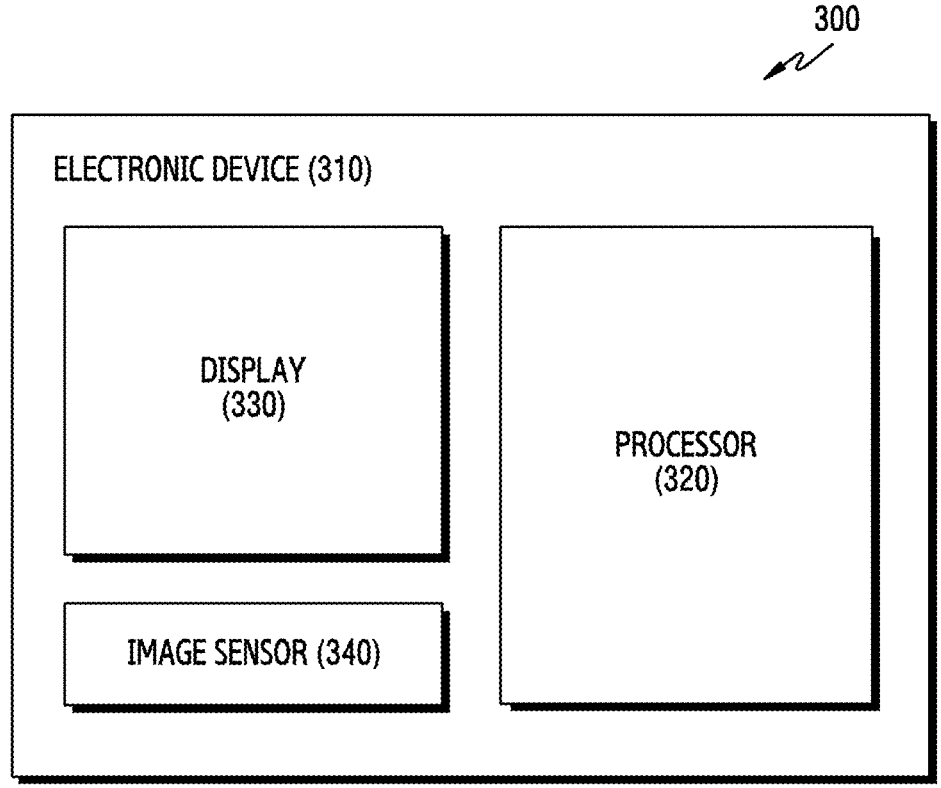
FIG. 3 illustrates a block diagram illustrating an electronic device, according to an embodiment of the disclosure.

FIG. 3 illustrates a block diagram 300 illustrating an electronic device according to an embodiment of the disclosure.

As shown in FIG. 3, an electronic device 310 (e.g., the electronic device 101 of FIG. 1) may include a processor 320 (e.g., the processor 120 of FIG. 1), a display 330 (e.g., the display device 160 of FIG. 1), and an image sensor 340. The image sensor 340 of FIG. 3 may correspond to the image sensor 230 of FIG. 2.

According to an embodiment, the processor 320 may control the display 330 to display a preview image including an image generated from information acquired through the image sensor 230. The processor 320 may perform a zoom-in operation or zoom-out operation for the preview image. The processor 320 may determine whether it is necessary to change an output mode of the image sensor in response to the zoom-in operation or the zoom-out operation. For example, if a magnitude for the preview image is greater than or equal to a specified value by the zoom-in operation performed in response to a user input, the processor 320 may execute an instruction which determines to change the output mode of the image sensor.

In an embodiment, the processor 320 may generate an Inter-Integrated Circuit (I2C) instruction which allows to change the output mode of the sensor, upon determining that it is necessary to change the output mode of the image sensor 230. The processor 320 may control the sensor to change the output mode of the sensor by executing the generated I2C instruction while the image sensor 230 maintains an active state. The processor 320 may change a sensor index recorded in a register to have access to information on a sensor mode which is currently in use, in response to the change of the output mode. In this document, it may be understood that the operation of the electronic device is performed by executing instructions included in a memory (e.g., the memory 130 of FIG. 1) to process data or to control components of the electronic device.

Figure 4:
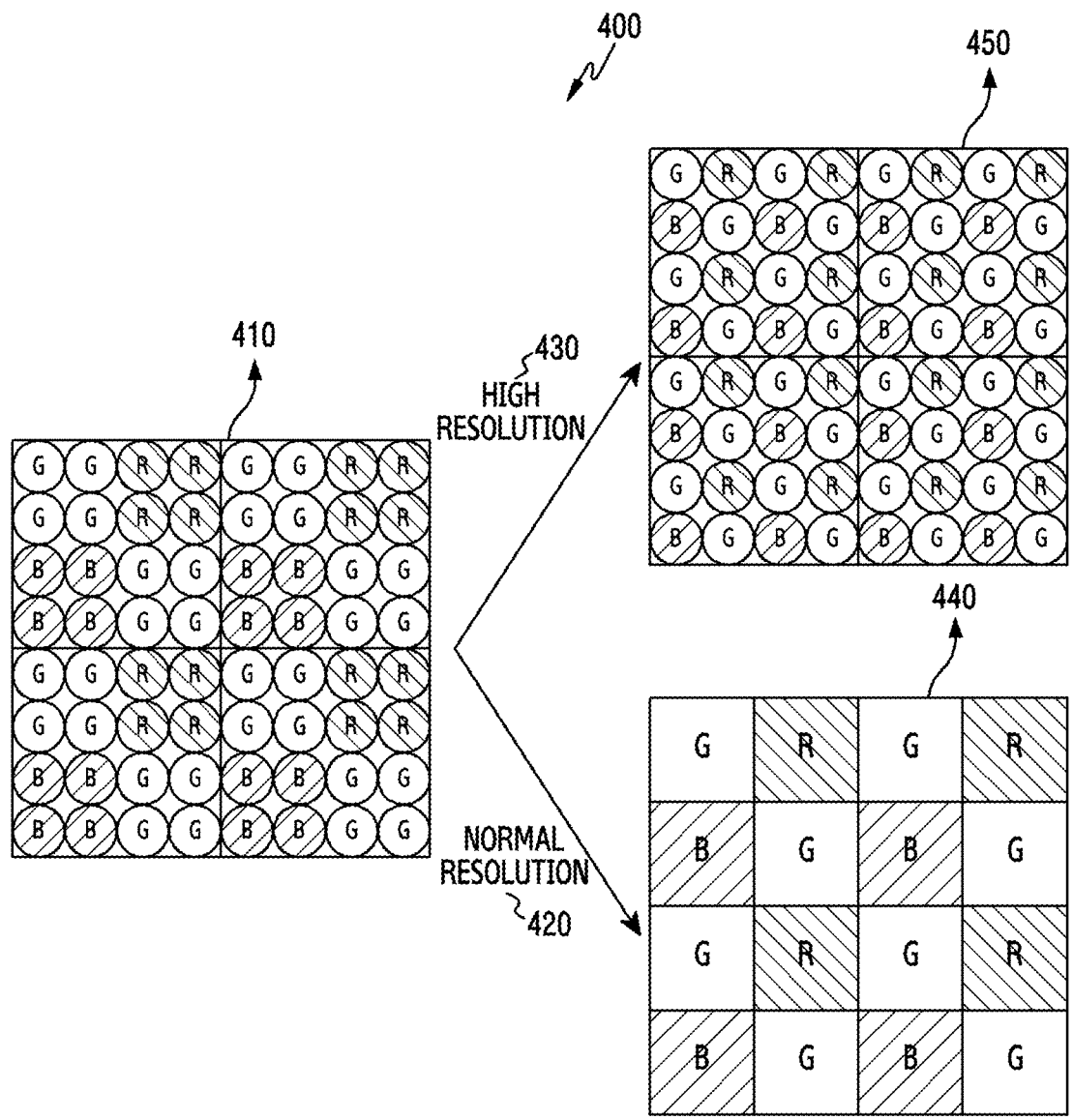
FIG. 4 illustrates an operational diagram illustrating a mode change of an image sensor 230, according to various embodiments.

FIG. 4 illustrates an operational diagram 400 illustrating a mode change of the image sensor 230 according to various embodiments.

According to an embodiment, the image sensor 230 of the electronic device 101 may include a tetra cell sensor. For example, in a first mode 410 in which four filters with the same color are arranged in four cells, the tetra cell sensor may be a sensor which outputs an average of values detected through the four cells as a color value for one pixel. The filter may include one or more of red, green, and blue color filters. The output mode of the image sensor of the electronic device 101 may include a second mode 440 which is a sensor output mode used in a normal resolution 420 and a third mode 450 which is a sensor output mode used in a high resolution 430. If it is necessary to change the resolution, a change between the second mode 440 and the third mode 450 may be included in the tetra cell sensor. For example, the change of the sensor output mode may imply that each of cell values of the image sensor is acquired and then arrays of the acquired cell values are changed if it is necessary to change the resolution.

According to an embodiment, the image sensor 230 of the electronic device 101 may be changed to a re-mosaic mode. For example, the image sensor 230 may re-arrange arrays of respective cell values of the image sensor by using a re-mosaic algorithm from the second mode 440 in which the same four filters are arranged in adjacent four cells to output values acquired through the four cells. The image sensor 230 may be changed to a mode in which arrays of acquired cell values are re-arranged similarly to being output from an image sensor having filters arranged as in the third mode 450. In addition, the image senor may be changed from the mode in which arrays of acquired cell values are re-arranged similarly to being output from the image sensor having filters arranged as in the third mode 450 to the second mode 440 in which four cell values are re-arranged by using a re-mosaic algorithm and four filters with the same color are arranged in four cells. The third mode 450 which is a sensor output mode used in the high resolution 430 may be referred to as a re-mosaic mode. A resolution of the high resolution 430 may include a higher resolution than the normal resolution 420.

According to an embodiment, when a brightness value of the image generated from the information acquired through the image sensor 230 is low illuminance or a normal resolution is required since a low magnification is set by a zoom-out operation, it is possible to operate with the second mode 440 in the first mode 410. When the brightness value of the generated image is high illuminance and a high resolution is required since a user performs a zoom-in operation, it is possible to operate with the third mode 450 in the first mode 410. For example, the electronic device may calculate an illuminance value for an image from cell values included in the image generated based on the information acquired through the image sensor. The high illuminance may refer to a case where the calculated illuminance value is greater than or equal to a designated value, and the low illuminance may refer to a case where the calculated illuminance value is less than the designated value. For example, if the user operates a camera of the electronic device 101 when a brightness value of an image is high illuminance and the user performs a zoom-in operation, an image sensor mode may be changed to the third mode 450 to acquire a high-resolution image. On the other hand, when the brightness value of the image is low illuminance, the image sensor mode may be changed to the second mode 440 to acquire a normal-resolution image.

According to an embodiment, the electronic device 101 may implement a high-resolution camera and a low-resolution camera by using a change in a mode (e.g., the second mode 440 of FIG. 4, the third mode 450 of FIG. 4) of the image sensor 230 in which two outputs are supported with one camera.

The description of FIG. 4 is presented for explaining an embodiment for changing an operational mode of an image sensor, and thus the operational mode of the image sensor is not limited to the example illustrated in FIG. 4.

Figure 5:
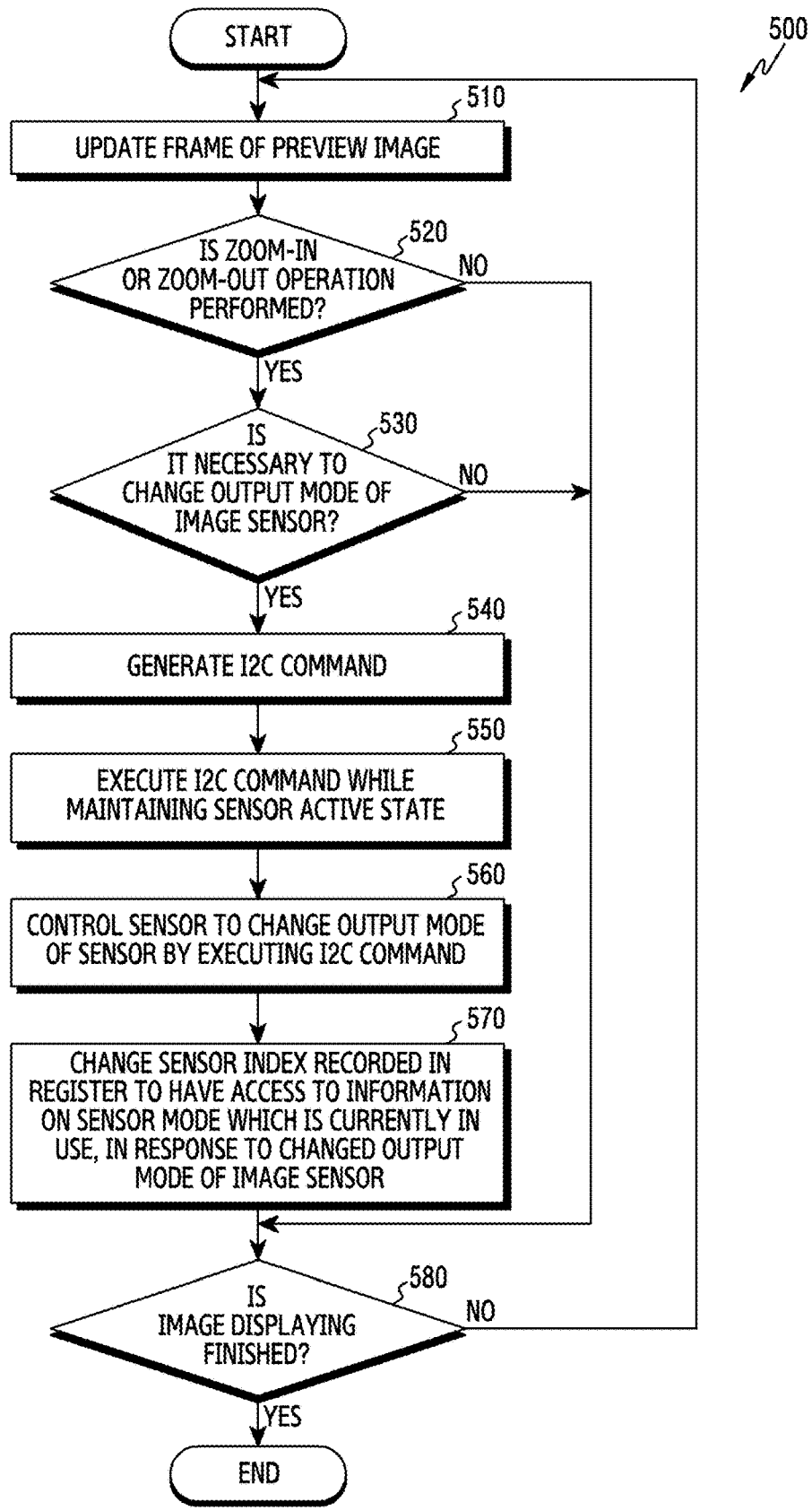
FIG. 5 illustrates a flowchart illustrating an operation of displaying an image in an electronic device, according to various embodiments.

FIG. 5 illustrates a flowchart 500 illustrating an operation of displaying an image in an electronic device according to various embodiments.

According to an embodiment, in an operation 510, the electronic device (e.g., the electronic device 101 of FIG. 1, the electronic device 310 of FIG. 3) may update a frame of a preview image. The electronic device 101 may display or update the preview image including an image generated from information acquired through the image sensor 230. For example, in a case where a user performs a camera application to operate a camera, a sensor output coming from the image sensor may be received in an ISP when a face recognition function is used or when the user makes a video call. When the sensor output is received in the ISP, the electronic device 101 may output the preview according to a frame generated based on the sensor output. In addition, the electronic device 101 may output the preview by persistently updating the frame, based on the sensor output.

According to an embodiment, in an operation 520, the electronic device 101 may determine whether to perform a zoom-in or zoom-out operation. The zoom-in operation may include a digital zoom-in operation. The digital zoom-in operation may include displaying an image by enlarging the image through signal processing for an image according to a user's input. The zoom-out operation may include a digital zoom-out operation. The digital zoom-out operation may include displaying an image by reducing the image through signal processing for an image according to a user's input. For example, the electronic device (e.g., the electronic device 101 of FIG. 1, the electronic device 310 of FIG. 3) may include the digital zoom-in or zoom-out operation in which a user touches the display device 160 (e.g., a touchscreen display) to enlarge or reduce a screen. Alternatively, it is possible to include an operation in which the user selects a zoom magnification indication on the screen to enlarge or reduce the screen. Upon determining to perform the zoom-in or zoom-out operation in the operation 520, the electronic device 101 may perform an operation 530, and otherwise, may perform an operation 580.

According to various embodiments, in the operation 530, the electronic device (e.g., the electronic device 101 of FIG. 1, the electronic device 310 of FIG. 3) may determine whether it is necessary to change an output mode of the image sensor 230. The electronic device (e.g., the electronic device 101 of FIG. 1, the electronic device 310 of FIG. 3) may determine a zoom magnification to determine whether it is necessary to change the output mode of the image sensor 230. According to various embodiments, the electronic device (e.g., the electronic device 101 of FIG. 1, the electronic device 310 of FIG. 3) may determine whether to change the output mode by further considering an illuminance value of an image generated from information acquired through the image sensor 230. For example, the electronic device 101 may determine whether it is necessary to change the output mode of the image sensor 230 by acquiring an illuminance value of an image (e.g., a preview image displayed in an operation 1110 of FIG. 11) currently viewed and a zoom magnification value which is set by the user, in a process of performing auto exposure of the electronic device 101. When the illuminance value and the zoom magnification value satisfy a sensor change condition, the electronic device 101 may determine that it is necessary to change the output mode of the image sensor 230.

In an embodiment, upon determining that it is necessary to change a sensor in a specific operation, the electronic device (e.g., the electronic device 101 of FIG. 1, the electronic device 310 of FIG. 3) may store a frame IDentifier (ID) of a case where a sensor change condition is detected, and may set a frame ID of a case where it is changed, to a value acquired by adding 1 to the frame ID (i.e., frame ID+1) of the case where the sensor change condition is detected. The frame ID may be a variable which increases by 1 with a specific period. According to an embodiment, the electronic device (e.g., the electronic device 101 of FIG. 1, the electronic device 310 of FIG. 3) may update the frame ID in a specific register so that it can be referred to in other modules, and may determine whether there is an updated frame ID for each frame. According to an embodiment, the electronic device (e.g., the electronic device 101 of FIG. 1, the electronic device 310 of FIG. 3) may maintain a previous state if there is no updated frame ID or if the updated frame ID is less than the frame ID of the case where the change is performed previously. According to an embodiment, the electronic device (e.g., the electronic device 101 of FIG. 1, the electronic device 310 of FIG. 3) may perform the sensor change if there is the updated frame ID and a corresponding value is greater than the frame ID of the case where the change is performed previously.

In an embodiment, upon determining that it is necessary to change the output mode of the image sensor in the operation 530, the electronic device 101 may perform an operation 540, and otherwise, may perform the operation 580.

According to an embodiment, in the operation 540, the electronic device (e.g., the electronic device 101 of FIG. 1, the electronic device 310 of FIG. 3) may generate an Inter-Integrated Circuit (I2C) command. The I2C command may also be referred to as an I2C instruction. The I2C command may be used when a writing operation is performed through the I2C instruction for register values such as an address, data, type, or the like for each sensor or module, without having to directly read or write a value of the sensor or module. For example, the electronic device (e.g., the electronic device 101 of FIG. 1, the electronic device 310 of FIG. 3) may generate register values such as an address, data, type, or the like which is information on a sensor mode which is the second mode 440 of FIG. 4 and a sensor mode which is the third mode 450. The electronic device (e.g., the electronic device 101 of FIG. 1, the electronic device 310 of FIG. 3) may change the sensor mode which is the second mode 440 of FIG. 4 to the sensor mode which is the third mode 450 by using the generated I2C command.

According to an embodiment, in an operation 550, the electronic device (e.g., the electronic device 101 of FIG. 1, the electronic device 310 of FIG. 3) may execute the I2C command while maintaining a sensor active state. According to an embodiment, the electronic device (e.g., the electronic device 101 of FIG. 1, the electronic device 310 of FIG. 3) may configure register values for controlling the image sensor 230. The register values may include an address, data, a type, etc.

According to an embodiment, a sensor change scheme may imply a scheme in which the I2C command is executed by being created with the register values such as the address, the data, and the type. For example, the electronic device (e.g., the electronic device 101 of FIG. 1, the electronic device 310 of FIG. 3) may create the I2C command with the register value and write the register value to change a sensor output mode.

According to an embodiment, the step of creating the I2C command to write the register value such as the address, the data, and the type may be complete within 1 frame. For example, a frame N may be when a user increases a zoom magnification to satisfy a sensor change condition and thus an operation for changing the sensor is performed, and a frame (N+1) may be when the sensor is changed by executing the I2C command for changing the sensor.

According to an embodiment, the sensor activation may include receiving an output signal of the image sensor 230 without having to interrupt an output of the image sensor 230. The receiving of the output signal may include an operation in which the ISP 260 receives the output signal of the sensor. According to an embodiment, the electronic device (e.g., the electronic device 101 of FIG. 1, the electronic device 310 of FIG. 3) may skip a stream-on/off process and may perform sensor setting writing. The operation of interrupting a stream of signals output from the sensor by deactivating the sensor may be referred to as a stream-off operation, and an operation of activating the sensor may be referred to as a stream-on operation.

Conventionally, the sensor is deactivated to achieve 'sensor stream-off' and then a sensor setting for changing an output mode of the sensor is transmitted through I2C (sensor setting writing) and delivered to the ISP 260. Thereafter, it is possible to perform the stream-on operation of the image sensor 230.

According to an embodiment, in an operation 560, the electronic device (e.g., the electronic device 101 of FIG. 1, the electronic device 310 of FIG. 3) may control the sensor so that the output mode of the image sensor 230 is changed. For example, when a brightness value of the image generated from the information acquired through the image sensor 230 is low illuminance or a normal resolution is required since a low magnification is set by a zoom-out operation, the electronic device (e.g., the electronic device 101 of FIG. 1, the electronic device 310 of FIG. 3) may control the image sensor 230 and/or the ISP 260 so that it is possible to operate with the second mode 440 in the first mode 410. When the brightness value of the generated image is high illuminance and a high resolution is required since a user performs a zoom-in operation, the electronic device (e.g., the electronic device 101 of FIG. 1, the electronic device 310 of FIG. 3) may control the image sensor 230 and/or the ISP 260 so that it is possible to operate with the third mode 450 in the first mode 410.

According to an embodiment, in an operation 570, the electronic device (e.g., the electronic device 101 of FIG. 1, the electronic device 310 of FIG. 3) may change a sensor index recorded in a register to have access to information on a changed sensor mode in response to the changed output mode of the image sensor. The sensor index may be, for example, a variable used when accessing information on a sensor mode currently used in each module. In addition, the sensor index may indicate an order by which each sensor mode is defined. According to another example, the sensor index may be used when acquiring information on a sensor mode, i.e., a parameter such as an output size of a current sensor mode, a driving Frames Per Second (FPS), or the like.

According to an embodiment, the electronic device (e.g., the electronic device 101 of FIG. 1, the electronic device 310 of FIG. 3) may change a turning parameter and adjust a screen ratio in accordance with the information on the sensor mode in response to the changed sensor index. The electronic device (e.g., the electronic device 101 of FIG. 1, the electronic device 310 of FIG. 3) may generate an image by bringing a parameter for a sensor mode through the sensor index to generate an image based on the sensor mode. According to an embodiment, since the camera and the image sensor 230 have respective different turning parameter features, the camera, and the image sensor 230 may have respective different setting files. The setting file may include a set of parameters (e.g., brightness, color, noise, details, shading, and screen ratio) for performing a process of generating an image, based on information acquired from the image sensor. The sensor index may be stored by being mapped with the set of parameters thereof. The electronic device (e.g., the electronic device 101 of FIG. 1, the electronic device 310 of FIG. 3) may update a frame of a preview image, based on the changed parameters.

According to an embodiment, in the operation 580, the electronic device (e.g., the electronic device 101 of FIG. 1, the electronic device 310 of FIG. 3) may determine whether image displaying is finished. For example, the finishing of image displaying may include one of turning off the electronic device (e.g., the electronic device 101 of FIG. 1, the electronic device 310 of FIG. 3), discharging the electronic device, turning off a camera, entering an album while operating the camera, switching to a front camera mode while using a rear camera, and switching to a rear camera mode while using the front camera mode. Upon determining to finish the displaying of the image in the operation 580, the electronic device 101 may finish the displaying of the image, and otherwise, may perform the operation 510. The above operation (e.g., 500) may be repeated when the operation 510 is performed.

Figure 6:
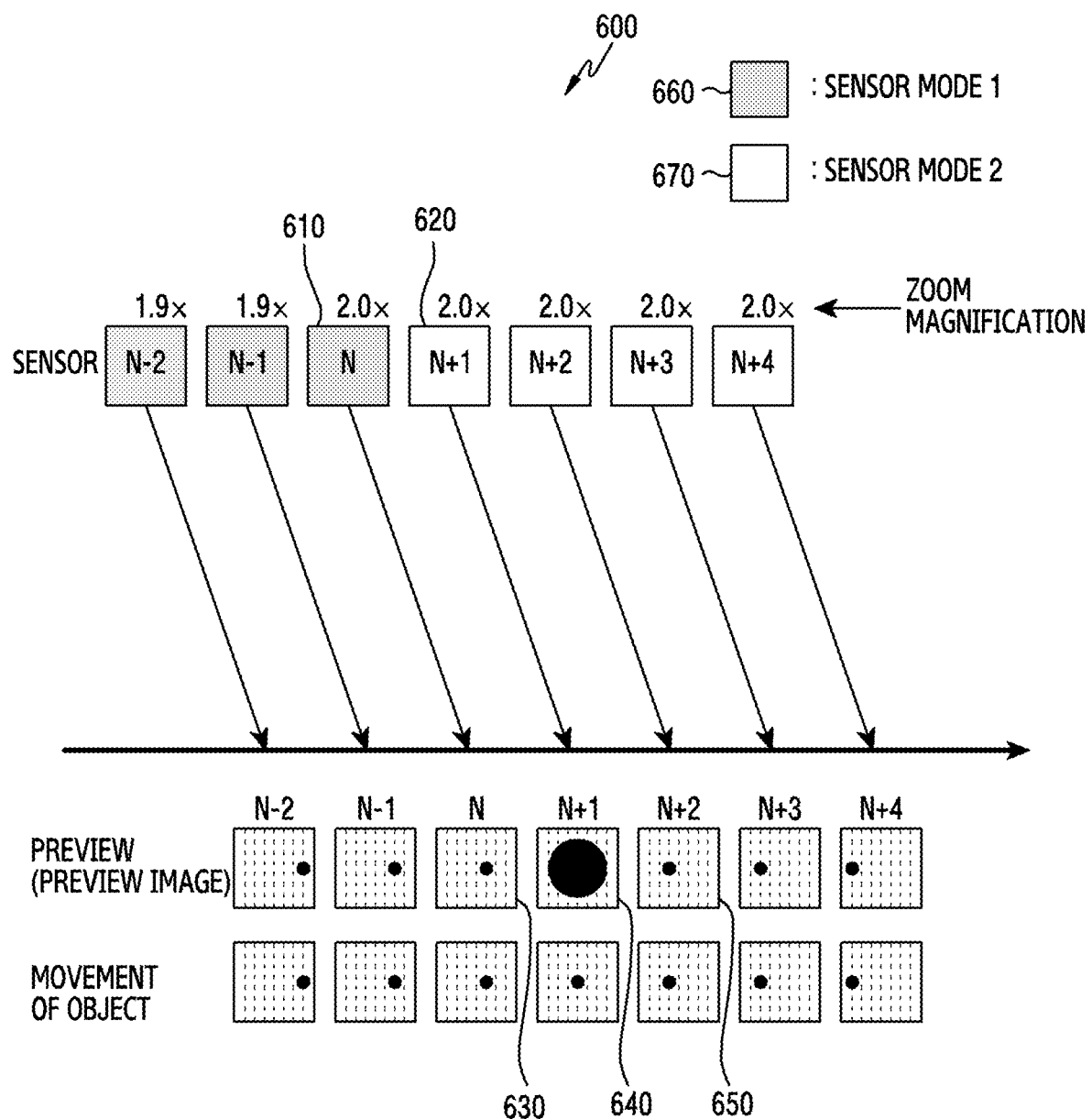
FIG. 6 illustrates a timing diagram illustrating a change in a sensor and preview when an update of an image frame is not skipped, according to various embodiments.

FIG. 6 illustrates a timing diagram 600 illustrating a change in a sensor and preview when an update of an image frame is not skipped, according to various embodiments.

According to an embodiment, a sensor mode-1 660 may include a mode (the second mode 440 of FIG. 4) in which four filters with the same color are arranged in four cells to output values acquired through the four cells. The sensor mode-1 660 may correspond to the second mode 440 of FIG. 4. According to another embodiment, a sensor mode-2 670 may include a mode in which arrays of acquired cell values are re-arranged similarly to being output from an image sensor having filters arranged as in the third mode 450. The sensor mode-2 670 may correspond to the third mode 450.

According to an embodiment, an operation 610 may correspond to a timing of detecting a necessity to change an output mode of the image sensor 230. The operation 610 may include a timing of determining whether it is necessary to change the output mode of the image sensor 230. The operation 610 may be in association with the operations 520 and 530 of FIG. 5. The electronic device (e.g., the electronic device 101 of FIG. 1, the electronic device 310 of FIG. 3) may perform a zoom-in or zoom-out operation in the operation 520 of FIG. 5. In the operation 530 of FIG. 5, the electronic device (e.g., the electronic device 101 of FIG. 1, the electronic device 310 of FIG. 3) may determine an illuminance value and zoom magnification of an image generated from information acquired through the image sensor 230 to determine whether it is necessary to change the output mode of the image sensor 230. According to an embodiment, the necessity to change the output mode of the image sensor may be detected, when the illuminance value is greater than or equal to a first value and the zoom magnification is changed from a value less than a second value to a value greater than or equal to the second value while a user increases the zoom magnification in the operation 610. For example, the changing of the zoom magnification from the value less than the second value to the value greater than or equal to the second value may include changing the zoom magnification from the magnification less than 2.0× to the magnification greater than or equal to 2.0×.

According to an embodiment, an operation 620 may be regarded as a timing next to the timing of detecting the necessity to change the output mode of the image sensor 230. For example, the operation 620 may be regarded as a (next) timing immediately after the timing of detecting the necessity to change the output mode of the image sensor 230. According to an embodiment, the operation 620 may be performed in association with the operations 540 to 570 of FIG. 5 and operations of FIG. 14.

According to an embodiment, in the operation 620, sensor setting writing and/or post-processing may be performed. In operation 620, the electronic device (e.g., the electronic device 101 of FIG. 1, the electronic device 310 of FIG. 3) may generate an I2C command. In operation 620, the electronic device may execute the I2C command while maintaining a sensor active state. In operation 620, a process of re-activating a sensor so that the sensor operates in the changed output mode may be skipped after interrupting a stream of signals output from the sensor by deactivating the sensor. An operation of interrupting a stream of signals output from the sensor by deactivating the sensor may be referred to as a stream-off operation, and an operation of activating the sensor may be referred to as a stream-on operation. The skipping of the stream-on/off process in the operation 620 may include receiving an output signal of the image sensor 230 without having to interrupt the output of the image sensor 230. The receiving of the output signal may include receiving the output signal of the sensor by the ISP 260. That is, according to an embodiment, the electronic device (e.g., the electronic device 101 of FIG. 1, the electronic device 310 of FIG. 3) may skip the stream-on/off process and may perform sensor setting writing. That is, in the operation 620, the electronic device (e.g., the electronic device 101 of FIG. 1, the electronic device 310 of FIG. 3) may perform the change of the output mode without having to perform the stream-on/off operation. In the operation 620, the post-processing may include one of changing a sensor index, changing a tuning parameter, and adjusting a screen ratio. The post-processing may be described below with reference to FIG. 14.

According to an embodiment, an operation 630 may include a frame of a preview image corresponding to a timing of determining that it is necessary to change an output mode of the image sensor 230. The operation 630 may be a preview image (or a preview) including an image generated from information acquired through an output of the image sensor of the operation 610.

According to an embodiment, an operation 640 may include a next frame of a preview image corresponding to the timing of determining that it is necessary to change the output mode of the image sensor 230. For example, the operation 640 may include a (next) frame immediately after the preview image corresponding to the timing of determining that it is necessary to change the output mode of the image sensor 230. The operation 640 may be a preview image (or a preview) including an image generated from information acquired through an output of the image sensor of the operation 620.

In an embodiment, an image generated from information acquired through a sensor (e.g., the image sensor 230) may be incorrectly viewed in a preview due to a timing applied in practice, when the post-processing conventionally achieved in the stream-on/off process is achieved while skipping the stream-on/off process. That is, it may take a specific time to apply the post-processing. For example, one frame may be output without applying the post-processing thereto. Therefore, hereinafter, a frame of a preview image in a duration before the post-processing is applied is not updated but skipped in FIG. 8 and FIG. 9, and thus previews of an operation 1030 of FIG. 10 and an operation 1110 of FIG. 11 may be directly viewed respectively in an operation 1040 of FIG. 10 and an operation 1120 of FIG. 11.

According to an embodiment, in an operation 650, the electronic device (e.g., the electronic device 101 of FIG. 1, the electronic device 310 of FIG. 3) may update an image generated from information acquired through an output of the sensor mode-2 670.

Figure 7:
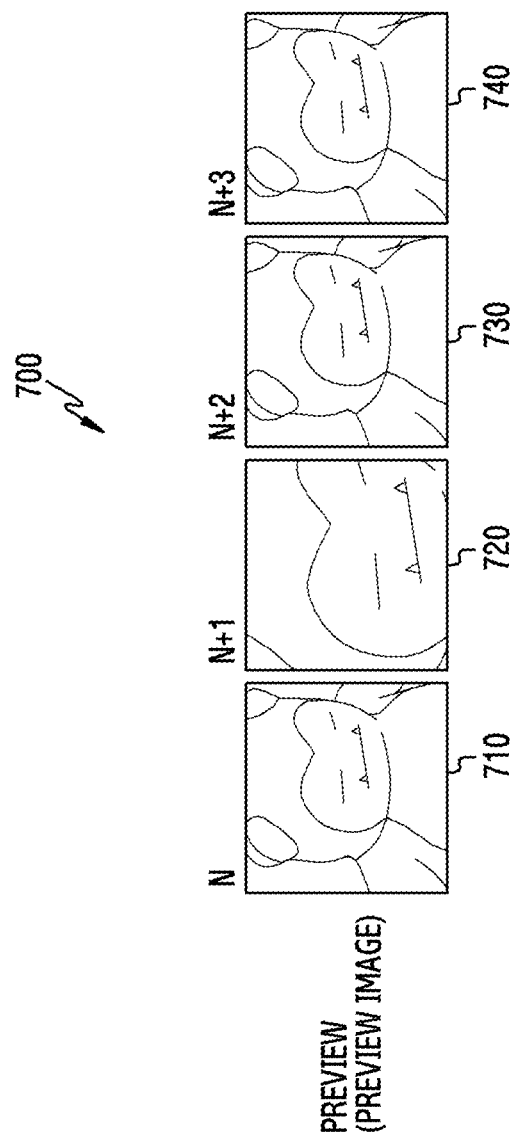
FIG. 7 illustrates an exemplary view illustrating an image acquired through a camera provided in an electronic device, when an update of an image frame is not skipped, according to various embodiments.

FIG. 7 illustrates an exemplary view 700 illustrating an image acquired through a camera provided in an electronic device (e.g., the electronic device 101 of FIG. 1, the electronic device 310 of FIG. 3), when an update of an image frame is not skipped, according to various embodiments.

According to an embodiment, an operation 710 may include a frame of a preview image corresponding to a timing of determining that it is necessary to change an output mode of an image sensor. For example, the operation 710 may be a preview image (or a preview) including an image generated from information acquired through an output of the image sensor of the operation 610 of FIG. 6

According to an embodiment, an operation 720 may include a frame which is at least one of frames next to a frame of a preview image corresponding to the timing of determining that it is necessary to change the output mode of the image sensor. For example, the operation 720 may include a (next) frame immediately after the frame of the preview image corresponding to the timing of determining that it is necessary to change the output mode of the image sensor. The operation 720 may be a preview image (or a preview) including an image generated from information acquired through an output of the image sensor of the operation 620 of FIG. 6

According to an embodiment, the operation 720 may include a process of updating a frame of the preview image. For example, in the operation 720, an image generated from information acquired through a sensor (e.g., the image sensor 230 of FIG. 2) may be incorrectly viewed in a preview due to a timing applied in practice, when the post-processing conventionally achieved in the stream-on/off process is achieved while skipping the stream-on/off process. That is, it may take a specific time to apply the post-processing. For example, one frame may be output without applying the post-processing thereto. Therefore, hereinafter, a frame of a preview image in a duration before the post-processing is applied is not updated but skipped in FIG. 8 and FIG. 9, and thus previews of the operation 1030 of FIG. 10 and the operation 1110 of FIG. 11 may be directly viewed respectively in the operation 1040 of FIG. 10 and the operation 1120 of FIG. 11.

According to an embodiment, the operation 720 may include a process of changing a sensor index, changing a tuning parameter, and adjusting a screen ratio. The process of changing the sensor index, changing the tuning parameter, and adjusting the screen ratio may not be applied to the operation 720 due to a timing to be applied in practice but may be applied to an operation 730.

According to an embodiment, in the operation 730, the electronic device (e.g., the electronic device 101 of FIG. 1, the electronic device 310 of FIG. 3) may update an image generated from information acquired through an output of the sensor mode-2 670. For example, the operation 730 may include properly applying the changing of the sensor value, the changing of the tuning parameter, and the adjusting of the screen ratio, in response to the sensor mode-2 670.

According to an embodiment, in an operation 740, a preview may be persistently updated in a state where the setting values are properly applied.

Figure 8:
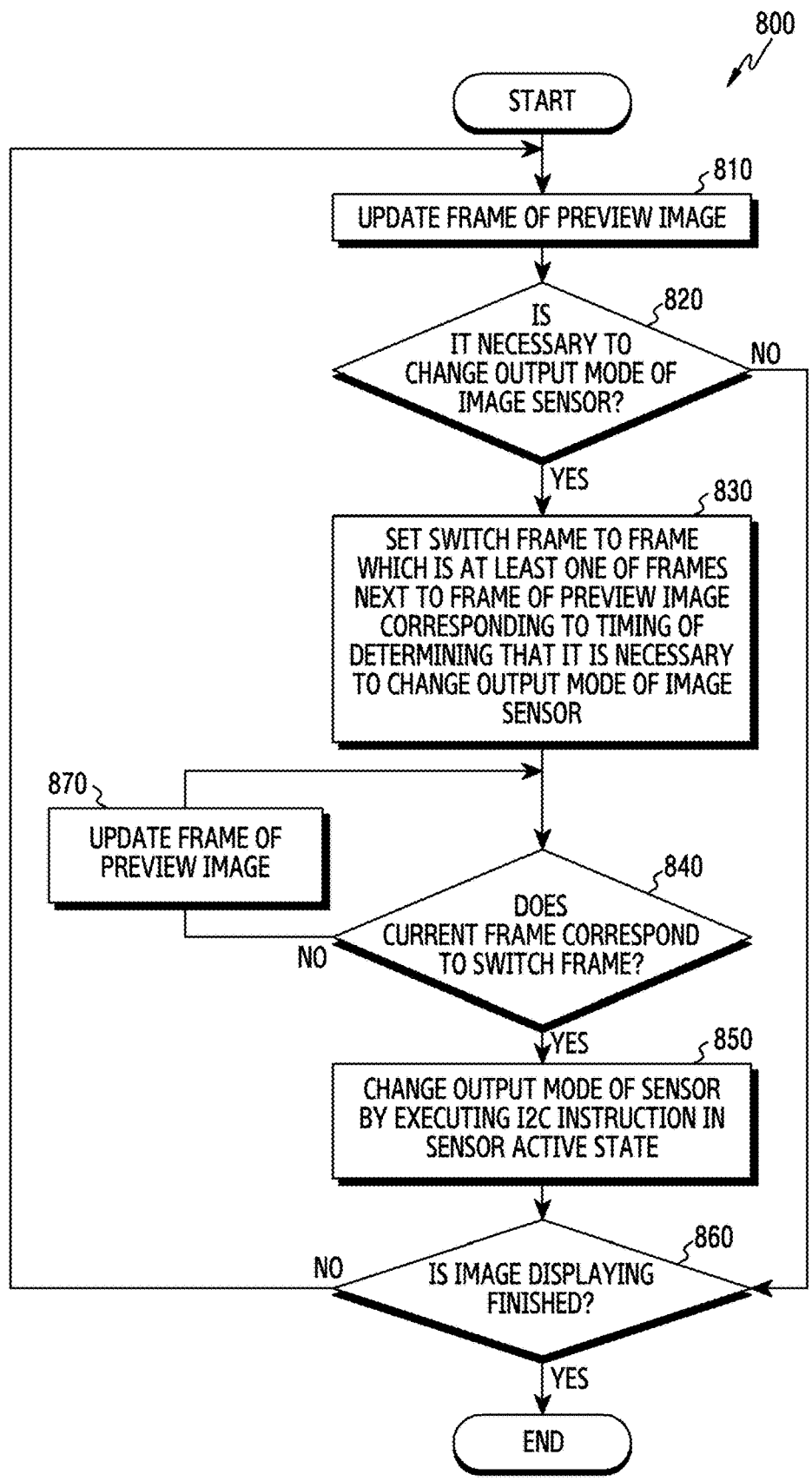
FIG. 8 illustrates a flowchart illustrating an operation of displaying an image in an electronic device, according to various embodiments.

FIG. 8 illustrates a flowchart 800 illustrating an operation of displaying an image in an electronic device (e.g., the electronic device 101 of FIG. 1, the electronic device 310 of FIG. 3) according to various embodiments.

According to an embodiment, in an operation 810, the electronic device (e.g., the electronic device 101 of FIG. 1, the electronic device 310 of FIG. 3) may update the frame of the preview image. The electronic device (e.g., the electronic device 101 of FIG. 1, the electronic device 310 of FIG. 3) may display or update the preview image including an image generated from information acquired through the image sensor 230. For example, in a case where a user performs a camera application to operate a camera, a sensor output which comes from the image sensor may be received in an ISP when a face recognition function is used or when the user makes a video call. When the sensor output is received in the ISP, the electronic device 101 may output the preview according to a frame generated based on the sensor output. In addition, the electronic device 101 may output the preview by persistently updating the frame, based on the sensor output.

According to an embodiment, in an operation 820, the electronic device (e.g., the electronic device 101 of FIG. 1, the electronic device 310 of FIG. 3) may determine whether it is necessary to change an output mode of the image sensor 230. The electronic device (e.g., the electronic device 101 of FIG. 1, the electronic device 310 of FIG. 3) may determine a zoom magnification to determine whether it is necessary to change the output mode of the image sensor 230. According to an embodiment, the electronic device (e.g., the electronic device 101 of FIG. 1, the electronic device 310 of FIG. 3) may determine whether to change the output mode by further considering an illuminance value of an image generated from information acquired through the image sensor 230. For example, the electronic device 101 may determine whether it is necessary to change the output mode of the image sensor 230 by acquiring an illuminance value of the image (e.g., a preview image displayed in an operation 1110 of FIG. 11) currently viewed and a zoom magnification value which is set by the user, in a process of performing auto exposure of the electronic device (e.g., the electronic device 101 of FIG. 1, the electronic device 310 of FIG. 3). When the illuminance value and the zoom magnification value satisfy a sensor change condition, the electronic device 101 may determine that it is necessary to change the output mode of the image sensor 230.

According to an embodiment, in an operation 830, the electronic device (e.g., the electronic device 101 of FIG. 1, the electronic device 310 of FIG. 3) may set a switch frame to a frame which is at least one of frames next to a frame of a preview image corresponding to the timing of determining that it is necessary to change the output mode of the image sensor.

For example, the at least one of frames next to the frame of the preview image corresponding to the timing of determining that it is necessary to change the output mode of the image sensor may include a (next) frame immediately after the frame of the preview image corresponding to the timing of determining that it is necessary to change the output mode of the image sensor. The timing of determining that it is necessary to change the output mode of the image sensor may include a timing at which an illuminance value is greater than or equal to a first value and a zoom magnification is changed from a value less than a second value to a value greater than or equal to the second value. The second value of the zoom magnification may include a magnification of 2.0×.

According to an embodiment, in an operation 840, the electronic device (e.g., the electronic device 101 of FIG. 1, the electronic device 310 of FIG. 3) may determine whether the current frame corresponds to the switch frame. Upon determining that the current frame corresponds to the switch frame in the operation 840, an operation 850 may be performed, and otherwise, a frame of a preview image may be updated (e.g., an operation 870) until the current frame corresponds to the switch frame. If the current frame corresponds to the switch frame, the electronic device (e.g., the electronic device 101 of FIG. 1, the electronic device 310 of FIG. 3) may skip the operation 870 of updating the frame of the preview image and may perform the operation 850 of changing the output mode of the sensor by executing an I2C instruction in a sensor active state. That is, the electronic device may change the output mode of the sensor by executing the I2C instruction within a duration in which the frame of the preview image is not updated. According to an embodiment, if the stream-on/off operation is not performed, the electronic device may perform an operation of changing the output mode of the sensor by executing the I2C instruction while one frame is not updated.

According to an embodiment, in the operation 850, the electronic device (e.g., the electronic device 101 of FIG. 1, the electronic device 310 of FIG. 3) may change the output mode of the sensor by executing the I2C instruction in the sensor active state. In the operation 850, the operation of executing the I2C instruction in the sensor active state may correspond to the operation 550 of FIG. 1. According to an embodiment, the electronic device (e.g., the electronic device 101 of FIG. 1, the electronic device 310 of FIG. 3) may configure register values for controlling the image sensor 230. The register values may include an address, data, a type, etc.

According to an embodiment, a sensor change scheme may imply a scheme in which the I2C command is executed by being created with the register values such as the address, the data, and the type. For example, the electronic device (e.g., the electronic device 101 of FIG. 1, the electronic device 310 of FIG. 3) may create the I2C command with the register value and write the register value to change a sensor output mode.

According to an embodiment, the step of creating the I2C command to write the register value such as the address, the data, and the type may be complete within 1 frame. For example, a frame N may be when a user increases a zoom magnification to satisfy a sensor change condition and thus an operation for changing the sensor is performed, and a frame (N+1) may be when the sensor is changed by executing the I2C command for changing the sensor. According to various embodiments, if a frame corresponding to the timing at which the operation of changing the sensor mode by executing the I2C instruction is the frame (N+1), starting from a next frame, i.e., a frame (N+2), the electronic device may perform an update for a frame of a preview image by using an image generated based on a signal output from the image sensor.

According to an embodiment, the sensor activation may include receiving an output signal of the image sensor 230 without having to interrupt an output of the image sensor 230. The receiving of the output signal may include an operation in which the ISP 260 receives the output signal. According to an embodiment, the electronic device (e.g., the electronic device 101 of FIG. 1, the electronic device 310 of FIG. 3) may skip a stream-on/off process and may perform sensor setting writing. The operation of interrupting a stream of signals output from the sensor by deactivating the sensor may be referred to as a stream-off operation, and an operation of activating the sensor may be referred to as a stream-on operation.

According to an embodiment, in an operation 860, the electronic device (e.g., the electronic device 101 of FIG. 1, the electronic device 310 of FIG. 3) may finish displaying of the image. For example, the electronic device (e.g., the electronic device 101 of FIG. 1, the electronic device 310 of FIG. 3) may finish the displaying of the image when discharged, when a camera is turned off, when entering an album while operating the camera, when switching to a front camera mode while using a rear camera, and when switching to a rear camera mode while using the front camera mode.

The operation 860 may correspond to the operation 580. Upon determining to finish the displaying of the image in the operation 860, the displaying of the image may be finished, and otherwise, the operation 810 may be performed. The operations of the flowchart 800 may be repeated when the operation 810 is performed.

According to an embodiment, in the operation 870, the electronic device (e.g., the electronic device 101 of FIG. 1, the electronic device 310 of FIG. 3) may update the frame of the preview image. For example, if a current frame ID does not correspond to a switch frame ID, when a sensor output coming from the image sensor is received in an ISP, a frame generated based on the sensor output may be updated to be output as a preview.

Figure 9:
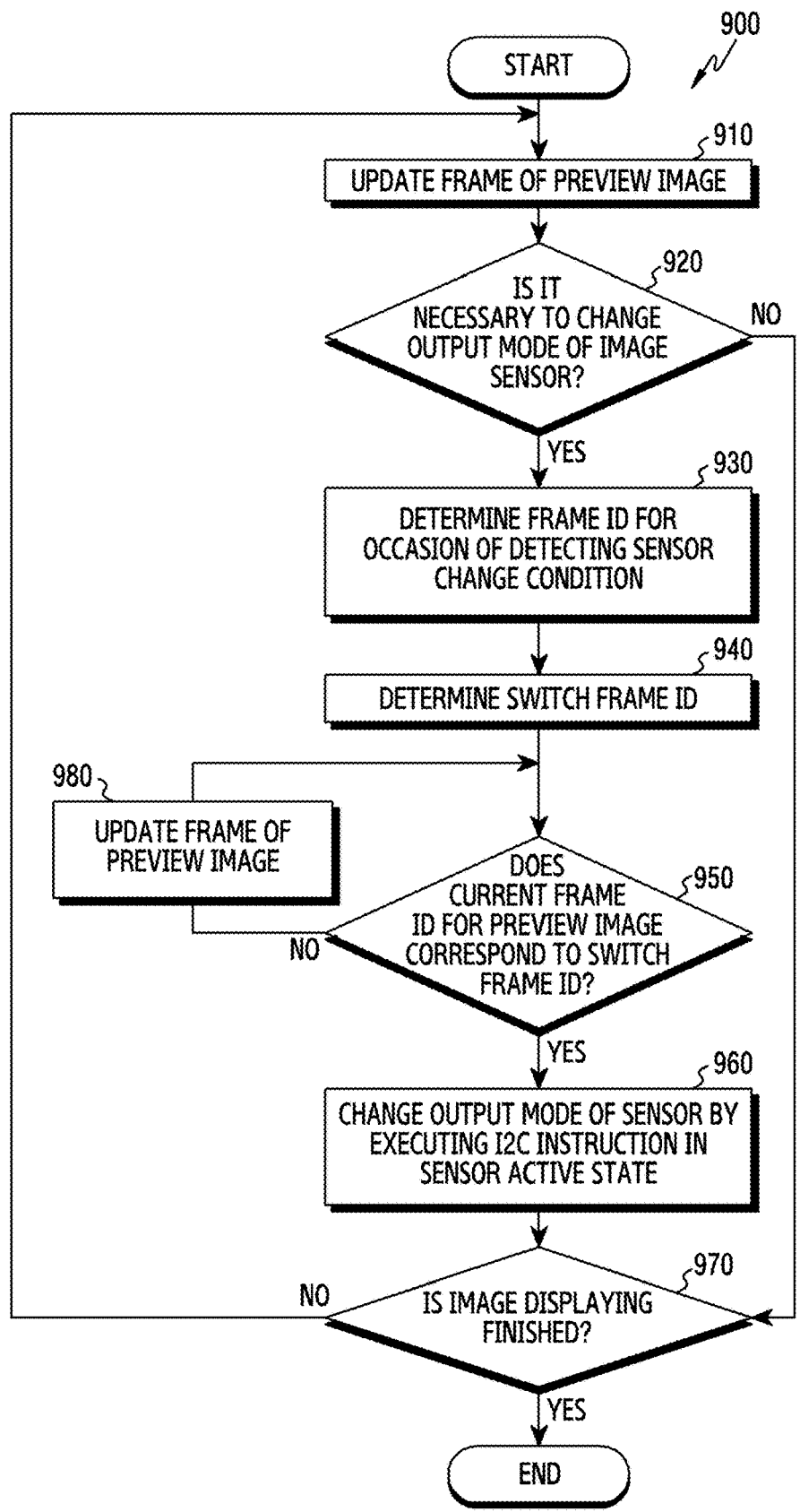
FIG. 9 illustrates a flowchart illustrating a process of skipping a frame of a preview image in an electronic device, according to various embodiments.

FIG. 9 illustrates a flowchart 900 illustrating a process of skipping a frame of a preview image in an electronic device according to various embodiments.

According to an embodiment, in an operation 910, the electronic device (e.g., the electronic device 101 of FIG. 1, the electronic device 310 of FIG. 3) may update a frame of a preview image. When the frame of the preview image is updated, an image to which each changed setting value is applied may be viewed in the preview. The electronic device (e.g., the electronic device 101 of FIG. 1, the electronic device 310 of FIG. 3) may display or update the preview image including an image generated from information acquired through the image sensor 230. For example, in a case where a user performs a camera application to operate a camera, a sensor output which comes from the image sensor may be received in an ISP when a face recognition function is used or when the user makes a video call. When the sensor output is received in the ISP, the electronic device 101 may output the preview according to a frame generated based on the sensor output. In addition, the electronic device 101 may output the preview by persistently updating the frame, based on the sensor output.

According to an embodiment, in an operation 920, the electronic device (e.g., the electronic device 101 of FIG. 1, the electronic device 310 of FIG. 3) may determine whether it is necessary to change an output mode of an image sensor. The electronic device (e.g., the electronic device 101 of FIG. 1, the electronic device 310 of FIG. 3) may determine a zoom magnification to determine whether it is necessary to change the output mode of the image sensor 230. According to an embodiment, the electronic device (e.g., the electronic device 101 of FIG. 1, the electronic device 310 of FIG. 3) may determine whether to change the output mode by further considering an illuminance value of an image generated from information acquired through the image sensor 230. For example, the electronic device may determine whether it is necessary to change the output mode of the image sensor 230 by acquiring an illuminance value of the image (e.g., a preview image displayed in an operation 1110 of FIG. 11) currently viewed and a zoom magnification value which is set by the user, in a process of performing auto exposure of the electronic device (e.g., the electronic device 101 of FIG. 1, the electronic device 310 of FIG. 3). When the illuminance value and the zoom magnification value satisfy a sensor change condition, the electronic device 101 may determine that it is necessary to change the output mode of the image sensor 230. The operation 920 may correspond to an operation 1220. Therefore, upon determining that it is necessary to change the output mode of the image sensor in the operation 920, operations 930 and 1230 may be performed, and otherwise, an operation 970 may be performed.

According to an embodiment, in the operation 930, the electronic device (e.g., the electronic device 101 of FIG. 1, the electronic device 310 of FIG. 3) may determine a frame ID for an occasion of detecting a sensor change condition. The occasion of detecting the sensor change condition includes an occasion of detecting that an illuminance value is greater than or equal to a first value and a zoom magnification is changed from a value less than a second value to a value greater than or equal to the second value. For example, a timing at which the zoom magnification is changed from the value less than the second value to the value greater than or equal to the second value may include a timing at which the zoom magnification is changed from a magnification less than 2.0× to a magnification greater than or equal to 2.0×.

According to an embodiment, in an operation 940, the electronic device (e.g., the electronic device 101 of FIG. 1, the electronic device 310 of FIG. 3) may determine a switch frame ID. According to an embodiment, the switch frame ID may include a frame ID next to a frame ID for an occasion of detecting a sensor change condition. For example, the switch frame ID may include a (next) frame ID immediately after the frame ID for the occasion of detecting the sensor change condition. According to another embodiment, the switch frame ID may be a frame ID for a frame which comes after a specific value from the frame ID for the occasion of detecting the sensor change condition. Alternatively, the switch frame ID may be plural in number or may be designated in a range. The frame ID may be, for example, a variable which increases by one with a specific period (e.g., the operation 970).

According to various embodiments, in an operation 950, the electronic device (e.g., the electronic device 101 of FIG. 1, the electronic device 310 of FIG. 3) may determine whether a current frame ID for a preview image corresponds to the switch frame ID. Upon determining that the current frame ID is identical to the switch frame ID in the operation 950, an operation 960 may be performed, and otherwise, the frame of the preview image may be updated (an operation 980) until the current frame ID for the preview image corresponds to the switch frame ID. For example, if the current frame ID is not identical to the switch frame ID, the operation 980 may be performed without having to change the output mode of the sensor. If the current frame ID is equal to the switch frame ID, the electronic device (e.g., the electronic device 101 of FIG. 1, the electronic device 310 of FIG. 3) may skip the operation 980 of updating the frame of the preview image, and may perform the operation 960 of changing the output mode of the sensor by executing an I2C instruction in a sensor active state.

According to an embodiment, in the operation 960, the electronic device (e.g., the electronic device 101 of FIG. 1, the electronic device 310 of FIG. 3) may change the output mode of the sensor by executing the I2C instruction in a sensor active state. For example, in the operation 960, the electronic device 101 may perform the operations 540 to 570 of FIG. 5. The electronic device (e.g., the electronic device 101 of FIG. 1, the electronic device 310 of FIG. 3) may generate the I2C command, and may execute the I2C command while maintaining a sensor active state. The sensor activation may include receiving an output signal of the image sensor 230 without having to interrupt an output of the image sensor 230. The receiving of the output signal may include an operation in which the ISP 260 receives the output signal of the sensor.

Figure 14:
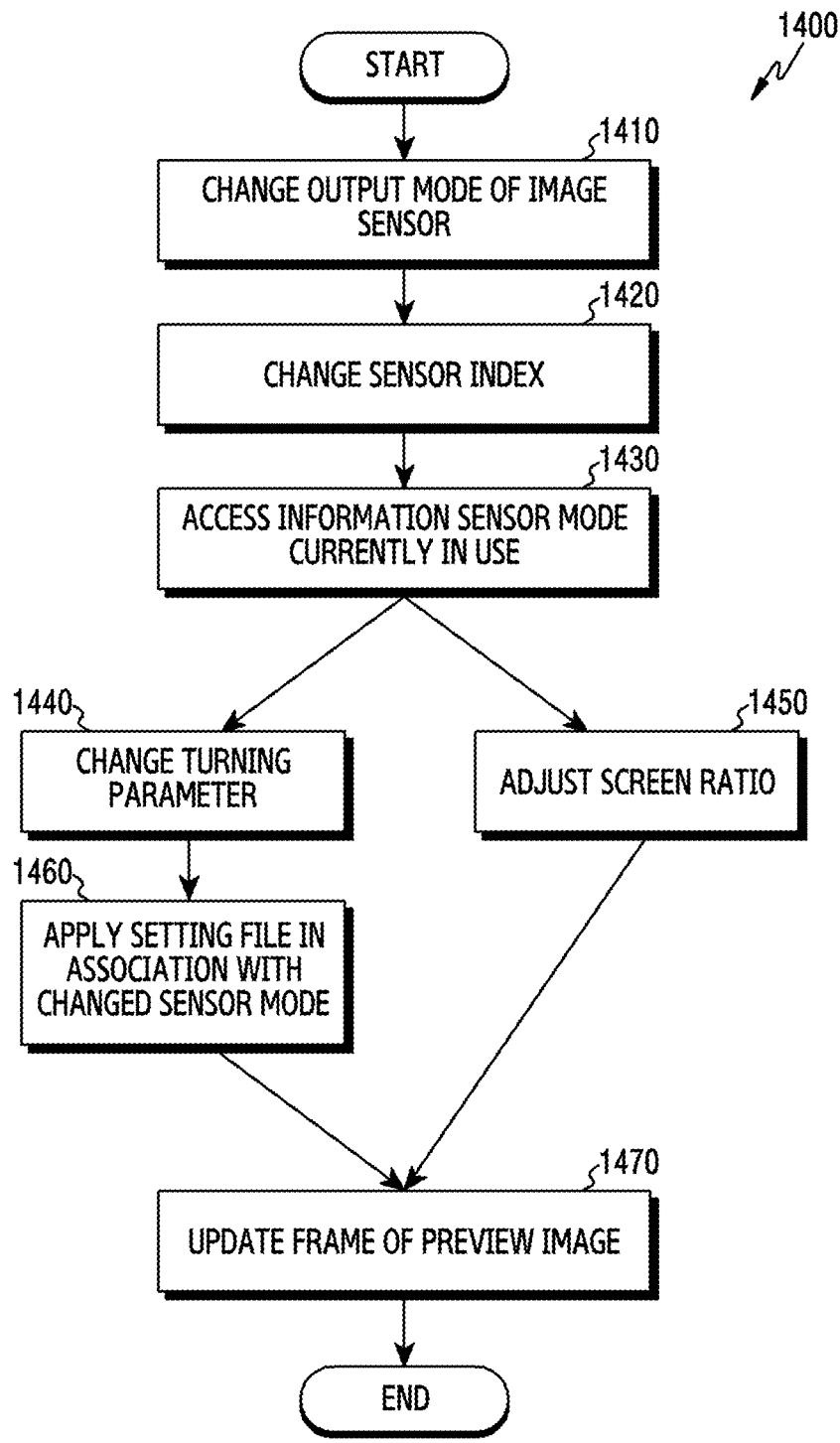
FIG. 14 illustrates a flowchart illustrating a process of updating a frame of a preview image, according to various embodiments.

The operation 960 may correspond to an operation 1410 of FIG. 14. For example, operations 1420 to 1460 of FIG. 14 may be performed after the operation 960 is performed. The operation 970 may be performed after the operations 1420 to 1460 are performed.

According to an embodiment, in the operation 970, the electronic device (e.g., the electronic device 101 of FIG. 1, the electronic device 310 of FIG. 3) may finish displaying of the image. For example, the electronic device (e.g., the electronic device 101 of FIG. 1, the electronic device 310 of FIG. 3) may finish the displaying of the image when discharged, when a camera is turned off, when entering an album while operating the camera, when switching to a front camera mode while using a rear camera, and when switching to a rear camera mode while using the front camera mode. The operation 970 may correspond to the operations 580 and 860. Upon determining to finish the displaying of the image in the operation 970, the displaying of the image may be finished, and otherwise, the operation 910 may be performed. The operations of the flowchart 900 may be repeated when the operation 910 is performed.

According to an embodiment, in the operation 980, the electronic device (e.g., the electronic device 101 of FIG. 1, the electronic device 310 of FIG. 3) may update the frame of the preview image. For example, if a current frame ID for the preview image does not correspond to a switch frame ID, when a sensor output coming from the image sensor is received in an ISP, a frame generated based on the sensor output may be updated to be output as a preview.

Figure 10:
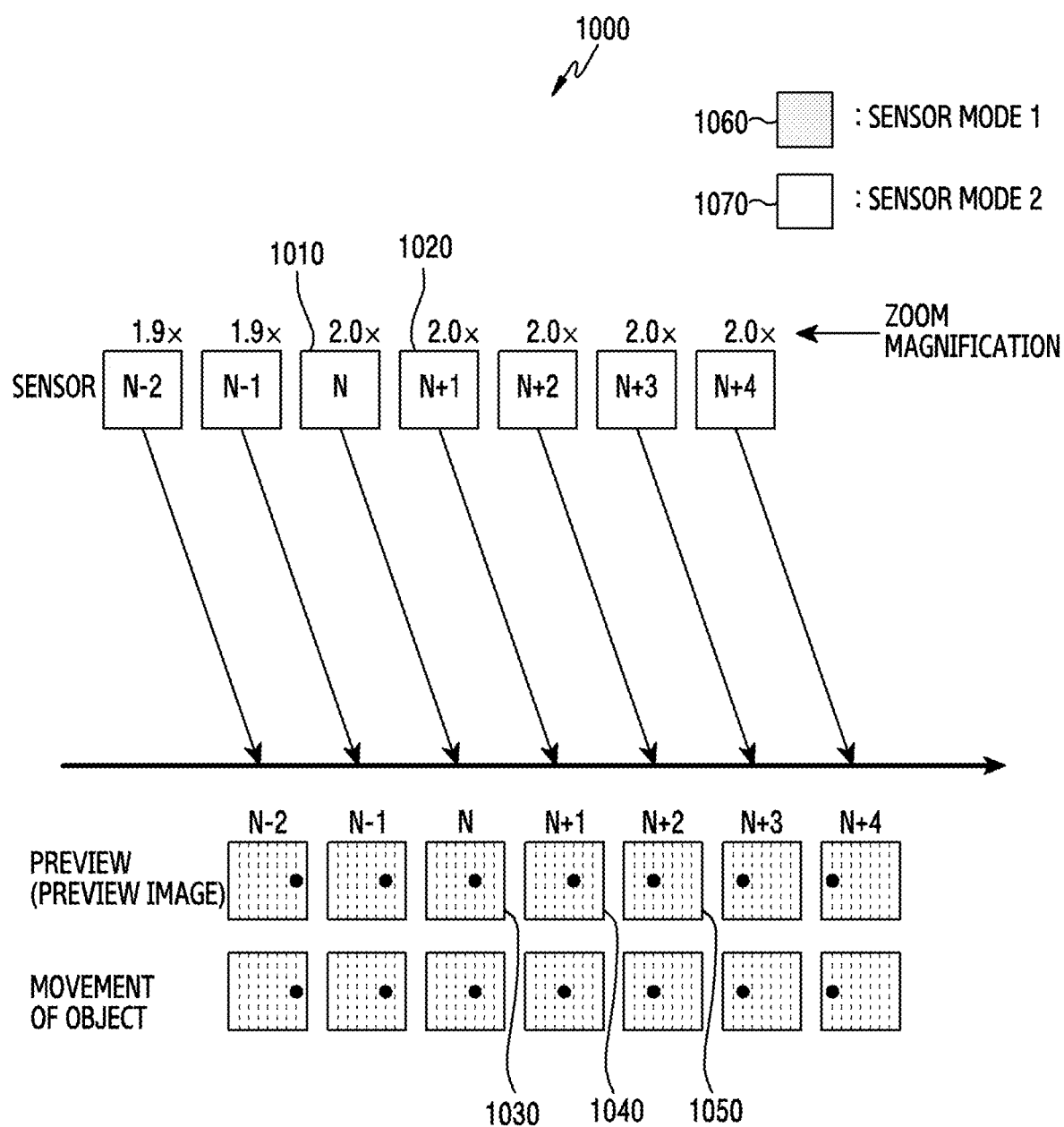
FIG. 10 illustrates a timing diagram illustrating a change in a sensor and preview, according to various embodiments.

FIG. 10 illustrates a timing diagram 1000 illustrating a change in a sensor and preview according to various embodiments.

According to an embodiment, a sensor mode-1 1060 may include a mode (the second mode 440 of FIG. 4) in which four same-color filters are arranged in four cells to output values acquired through the four cells. The sensor mode-1 1060 may correspond to the second mode 440 of FIG. 4. According to another embodiment, a sensor mode-2 1070 may include a mode in which arrays of acquired cell values are re-arranged similarly to being output from an image sensor having filters arranged as in the third mode 450. The sensor mode-2 1070 may correspond to the third mode 450 of FIG. 4.

According to an embodiment, an operation 1010 may correspond to a timing of detecting a necessity to change an output mode of the image sensor 230. The operation 1010 may include a timing of determining whether it is necessary to change the output mode of the image sensor 230. The operation 1010 may be in association with the operations 520 and 530 of FIG. 5. The electronic device (e.g., the electronic device 101 of FIG. 1, the electronic device 310 of FIG. 3) may perform a zoom-in or zoom-out operation in the operation 520 of FIG. 5. In the operation 530 of FIG. 5, the electronic device (e.g., the electronic device 101 of FIG. 1, the electronic device 310 of FIG. 3) may determine a zoom magnification to determine whether it is necessary to change the output mode of the image sensor 230. According to an embodiment, the electronic device may determine whether to change the output mode by further considering an illuminance value of an image generated from information acquired through the image sensor 230. According to an embodiment, the necessity to change the output mode of the image sensor may be detected, when the illuminance value is greater than or equal to a first value and the zoom magnification is changed from a value less than a second value to a value greater than or equal to the second value while a user increases the zoom magnification in the operation 1010. For example, the changing of the zoom magnification from the value less than the second value to the value greater than or equal to the second value may include changing the zoom magnification from the magnification less than 2.0× to the magnification greater than or equal to 2.0×.

According to an embodiment, an operation 1020 may be regarded as a timing next to the timing of detecting the necessity to change the output mode of the image sensor 230. For example, the operation 1020 may be regarded as a (next) timing immediately after the timing of detecting the necessity to change the output mode of the image sensor 230. According to an embodiment, the operation 1020 may be performed in association with the operations 540 to 570 of FIG. 5 and operations of FIG. 14.

For example, in the operation 1020, one or more of sensor setting writing and post-processing may be performed. In the operation 1020, an I2C command may be generated. In the operation 1020, the I2C command may be executed while maintaining a sensor active state. The sensor activation may skip the stream-on/off process. The operation of interrupting a stream of signals output from the sensor by deactivating the sensor may be referred to as a stream-off operation, and an operation of activating the sensor may be referred to as a stream-on operation. The skipping of the stream-on/off process in the sensor activation may include receiving an output signal of the image sensor 230 without having to interrupt the output of the image sensor 230. The receiving of the output signal may include receiving the output signal of the sensor by the ISP 260. That is, according to an embodiment, the electronic device (e.g., the electronic device 101 of FIG. 1, the electronic device 310 of FIG. 3) may skip the stream-on/off process and may perform sensor setting writing. That is, in the operation 1020, the electronic device (e.g., the electronic device 101 of FIG. 1, the electronic device 310 of FIG. 3) may perform the change of the output mode without having to perform the stream-on/off operation. In the operation 1020, the post-processing may include one of changing a sensor index, changing a tuning parameter, and adjusting a screen ratio. The post-processing may be described below with reference to FIG. 14.

According to an embodiment, an operation 1030 may include a frame of a preview image corresponding to a timing of determining that it is necessary to change an output mode of the image sensor 230. The operation 1030 may be a preview image (or a preview) including an image generated from information acquired through an output of the image sensor of the operation 1010.

According to an embodiment, an operation 1040 may include a frame next to a frame of a preview image corresponding to the timing of determining that it is necessary to change an output mode of an image sensor 230. For example, the operation 1040 may include a (next) frame immediately after the frame of the preview image corresponding to the timing of determining that it is necessary to change the output mode of the image sensor 230. The operation 1040 may be a preview image (or a preview) including an image generated from information acquired through an output of the image sensor of the operation 1020.

According to an embodiment, in the operation 1040, a preview which has a problem occurring in a preview of the operation 640 of FIG. 6 is not updated but skipped according to the operations of FIG. 8 and FIG. 9. Therefore, previews of the operation 1030 of FIG. 10 and the operation 1110 of FIG. 11 may be directly viewed respectively in the operation 1040 of FIG. 10 and the operation 1120 of FIG. 11. For example, if the frame is not updated in the preview, the electronic device (e.g., the electronic device 101 of FIG. 1, the electronic device 310 of FIG. 3) may allow a frame of a preview image of the operation 1030 corresponding to the timing of determining that it is necessary to change an output mode of the image sensor 230 to be viewed in a preview of the operation 1030 of a next timing. Since the frame is not updated in the preview, the preview may be viewed as if it stops during 1 frame of the operation 1040. The preview may include operating with 30 Frames Per Second (FPS), and may stop for 1/30 second in practice. This is a very short time which is difficult for a user to experience.

According to an embodiment, in an operation 1050, the electronic device (e.g., the electronic device 101 of FIG. 1, the electronic device 310 of FIG. 3) may display an image generated from information acquired through an output of the sensor mode-2 1070.

Figure 11:
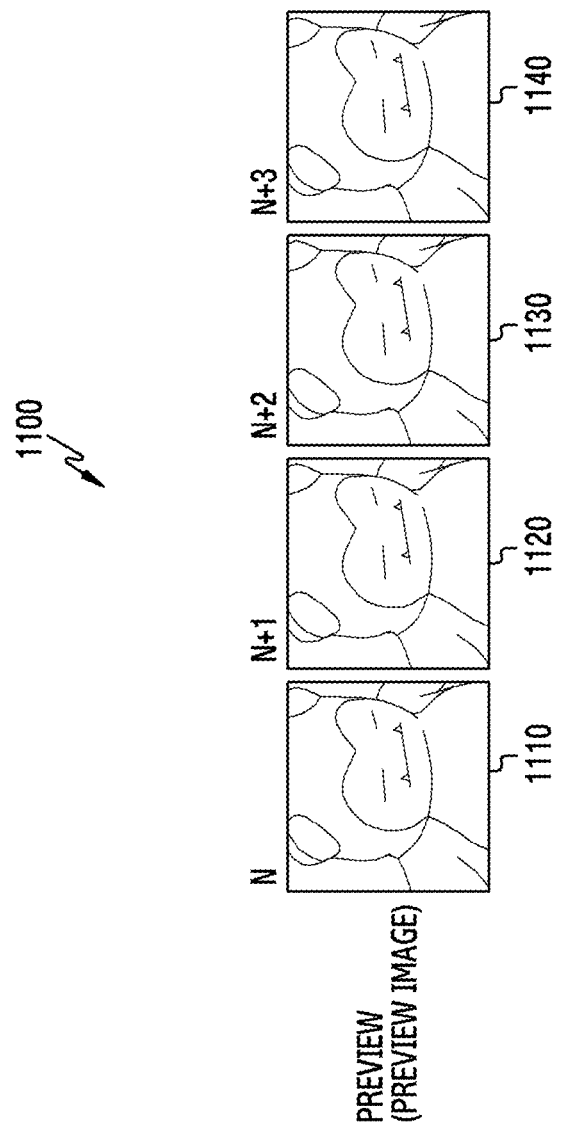
FIG. 11 illustrates an exemplary view illustrating an image acquired through a camera provided in an electronic device, according to various embodiments.

FIG. 11 illustrates an exemplary view 1100 illustrating an image acquired through a camera provided in an electronic device (e.g., the electronic device 101 of FIG. 1, the electronic device 310 of FIG. 3) according to various embodiments.

According to an embodiment, an operation 1110 may include a frame of a preview image corresponding to a timing of determining that it is necessary to change an output mode of an image sensor. For example, the operation 1110 may be a preview image (or a preview) including an image generated from information acquired through an output of the image sensor of the operation 1010 of FIG. 10.

According to an embodiment, an operation 1120 may include a frame which is at least one of frames next to a frame of a preview image corresponding to the timing of determining that it is necessary to change the output mode of the image sensor. For example, the operation 1120 may include a (next) frame immediately after the frame of the preview image corresponding to the timing of determining that it is necessary to change the output mode of the image sensor. The operation 1120 may be a preview image (or a preview) including an image generated from information acquired through an output of the image sensor of the operation 1020 of FIG. 10

According to an embodiment, the operation 1120 may include not updating the frame of the preview image. For example, instead of updating the frame of the preview image of FIG. 8 and FIG. 9 in the operation 1120, the update may be skipped in the operation 1120, thereby maintaining a frame of a preview displayed in the operation 1110.

According to an embodiment, the operation 1120 may include a process of changing a sensor index, changing a tuning parameter, and adjusting a screen ratio. The process of changing the sensor index, changing the tuning parameter, and adjusting the screen ratio may not be applied to the operation 1120 due to a timing to be applied in practice but may be applied to an operation 1130.

According to an embodiment, in the operation 1130, the electronic device (e.g., the electronic device 101 of FIG. 1, the electronic device 310 of FIG. 3) may update an image generated from information acquired through an output of a sensor mode-2 1070. For example, the operation 1130 may include properly applying the changing of the sensor value, the changing of the tuning parameter, and the adjusting of the screen ratio, in response to the sensor mode-2 1070.

According to an embodiment, in an operation 1140, a preview may be persistently updated in a state where the setting values are properly applied.

Figure 12:
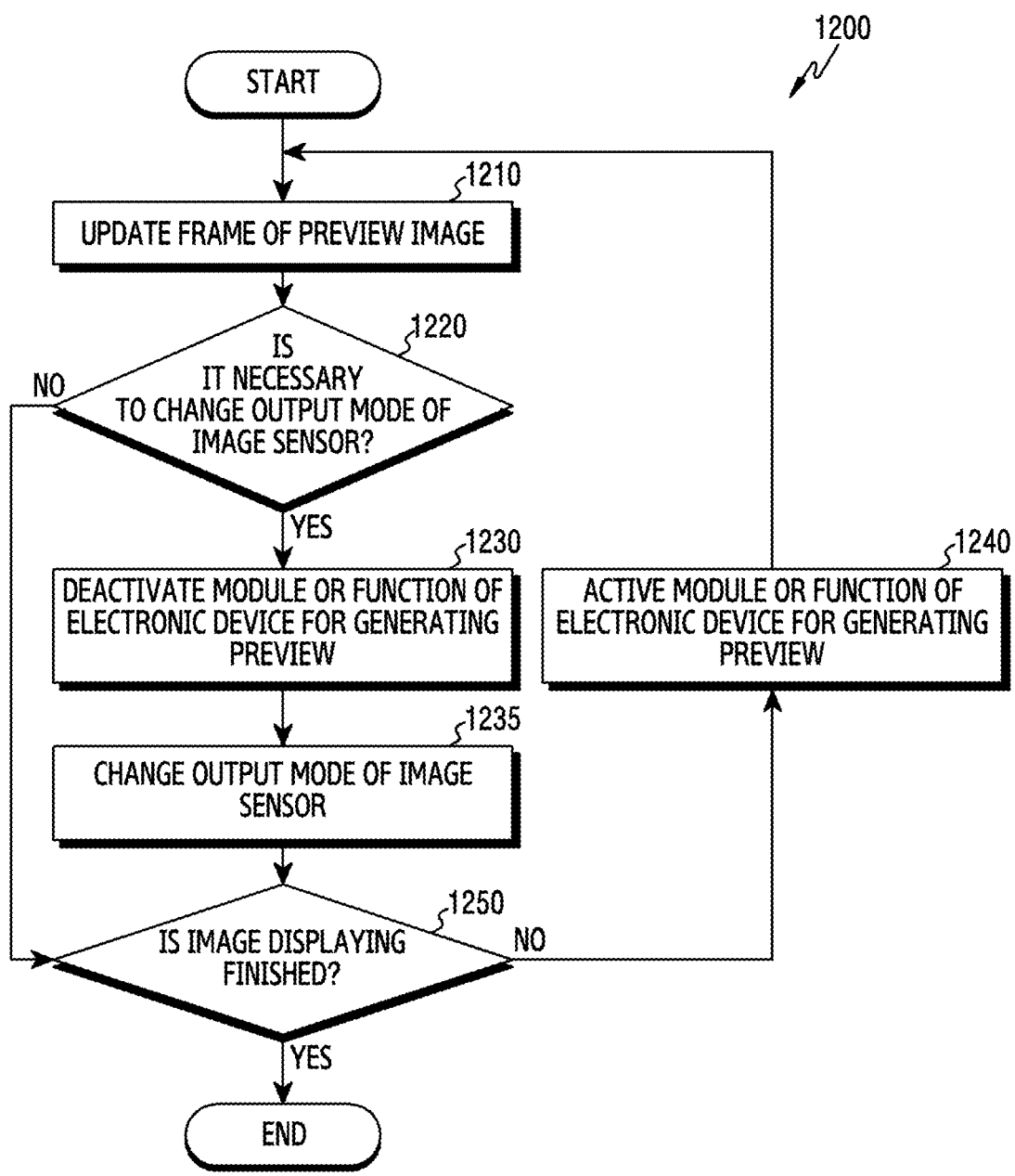
FIG. 12 illustrates a flowchart illustrating a process of deactivating a module or function of an electronic device, according to various embodiments.

FIG. 12 illustrates a process 1200 illustrating a process of deactivating a module or function of an electronic device according to various embodiments.

According to an embodiment, in an operation 1210, the electronic device (e.g., the electronic device 101 of FIG. 1, the electronic device 310 of FIG. 3) may update a frame of a preview image. The electronic device (e.g., the electronic device 101 of FIG. 1, the electronic device 310 of FIG. 3) may display or update the preview image including an image generated from information acquired through the image sensor 230. For example, in a case where a user performs a camera application to operate a camera, a sensor output which comes from the image sensor may be received in an ISP when a face recognition function is used or when the user makes a video call. When the sensor output is received in the ISP, the electronic device 101 may output the preview according to a frame generated based on the sensor output. In addition, the electronic device 101 may output the preview by persistently updating the frame, based on the sensor output.

The operation 1210 may correspond to the operation 510 of FIG. 5.

According to an embodiment, in an operation 1220, the electronic device (e.g., the electronic device 101 of FIG. 1, the electronic device 310 of FIG. 3) may determine whether it is necessary to change an output mode of an image sensor. The electronic device (e.g., the electronic device 101 of FIG. 1, the electronic device 310 of FIG. 3) may determine a zoom magnification to determine whether it is necessary to change the output mode of the image sensor 230. The operation 1220 may correspond to the operation 530. Therefore, the operation 520 may be performed after the operation 1210 is performed. The operation 1220 may be performed when a zoom-in or zoom-out operation is performed in the operation 520. According to an embodiment, the electronic device (e.g., the electronic device 101 of FIG. 1, the electronic device 310 of FIG. 3) may determine whether to change the output mode by further considering an illuminance value of an image generated from information acquired through the image sensor 230. For example, the electronic device 101 may determine whether it is necessary to change the output mode of the image sensor 230 by acquiring an illuminance value of the image (e.g., a preview image displayed in an operation 1110 of FIG. 11) currently viewed and a zoom magnification value which is set by the user, in a process of performing auto exposure of the electronic device (e.g., the electronic device 101 of FIG. 1, the electronic device 310 of FIG. 3). When the illuminance value and the zoom magnification value satisfy a sensor change condition, the electronic device 101 may determine that it is necessary to change the output mode of the image sensor 230. Upon determining that it is necessary to change the output mode of the image sensor in operation 1220, the electronic device 101 may perform an operation 1230, and otherwise, may perform an operation 1250.

According to an embodiment, in the operation 1230, the electronic device (e.g., the electronic device 101 of FIG. 1, the electronic device 310 of FIG. 3) may deactivate a module or function of the electronic device (e.g., the electronic device 101 of FIG. 1, the electronic device 310 of FIG. 3) for generating the preview. Since the module or function of the electronic device is deactivated while changing the output mode of the image sensor, a frame update may be skipped. That is, since the output of the sensor is coming while skipping the frame update, the module or function of the electronic device (e.g., the electronic device 101 of FIG. 1, the electronic device 310 of FIG. 3) which performs an arithmetic operation with the output of the sensor may be deactivated every frame. For example, an operation of deactivating the module or function of the electronic device (e.g., the electronic device 101 of FIG. 1, the electronic device 310 of FIG. 3) may include an operation of deactivating at least one of functions of Auto Exposure (AE), Auto While Balance (AWB), and Auto Focus (AF). The AE may include automatically adjusting proper brightness. The AWB may include a function which makes a white object appear white in color by correcting color having effect on illumination in a shooting environment. That is, it may include correcting a color sense. The AF may include a function of automatically focusing a subject. According to an embodiment, the operation 1230 may be performed in association with the operation 540 of FIG. 5 and the operation 930 of FIG. 9. That is, after the operation 1220, the operation 1230 may be performed in association with the operation 540 of FIG. 5 and the operation 930 of FIG. 9. According to an embodiment, the scheme of not performing the operation may include an operation in which an output from the sensor is received and whether the current frame is a switch frame is identified in association with the operation 840 before performing an arithmetic operation with an image of the output, and if the frames are identical, the arithmetic operation is not performed.

According to an embodiment, in an operation 1235, the electronic device (e.g., the electronic device 101 of FIG. 1, the electronic device 310 of FIG. 3) may change the output mode of the image sensor.

According to an embodiment, in an operation 1240, the electronic device (e.g., the electronic device 101 of FIG. 1, the electronic device 310 of FIG. 3) may activate a module or function of the electronic device (e.g., the electronic device 101 of FIG. 1, the electronic device 310 of FIG. 3) to generate a preview. The activating of the module or function of the electronic device (e.g., the electronic device 101 of FIG. 1, the electronic device 310 of FIG. 3) may include executing an arithmetic operation for the 3A (e.g., Auto Exposure (AE), Auto While Balance (AWB), and Auto Focus (AF)). In the operation 1240, the electronic device (e.g., the electronic device 101 of FIG. 1, the electronic device 310 of FIG. 3) may execute the arithmetic operation for the 3A if the current frame is not identical to the switch frame as a result of identification in association with the operation 840.

According to an embodiment, in the operation 1250, the electronic device (e.g., the electronic device 101 of FIG. 1, the electronic device 310 of FIG. 3) may finish displaying of the image. The operation 1250 may correspond to the operations 580, 860, and 970. For example, the electronic device (e.g., the electronic device 101 of FIG. 1, the electronic device 310 of FIG. 3) may finish the displaying of the image when discharged, when a camera is turned off, when entering an album while operating the camera, when switching to a front camera mode while using a rear camera, and when switching to a rear camera mode while using the front camera mode. Upon determining to finish the displaying of the image in the operation 1250, the electronic device 101 finishes the displaying of the image, and otherwise, may perform the operation 1240. When the operation 1240 is performed, the aforementioned process 1200 may be repeated by performing the operation 1210.

Figure 13:
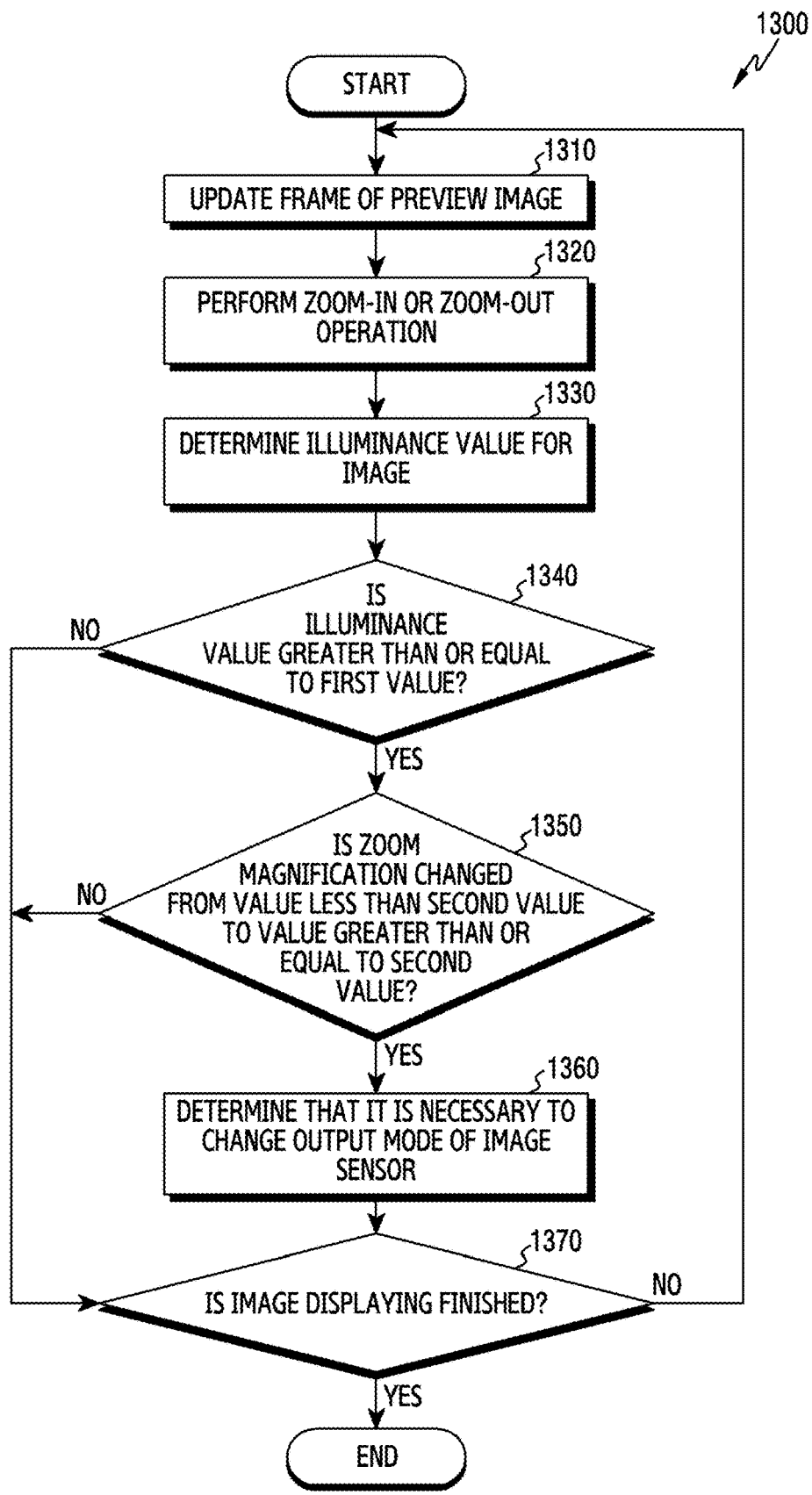
FIG. 13 illustrates a flowchart illustrating a process of determining a necessity to change an output mode of an image sensor in an electronic device, according to various embodiments.

FIG. 13 illustrates a process 1300 illustrating a process of determining a necessity to change an output mode of an image sensor in an electronic device according to various embodiments.

According to an embodiment, in an operation 1310, the electronic device (e.g., the electronic device 101 of FIG. 1, the electronic device 310 of FIG. 3) may update the frame of the preview image. The electronic device (e.g., the electronic device 101 of FIG. 1, the electronic device 310 of FIG. 3) may display or update the preview image including an image generated from information acquired through the image sensor 230. For example, a sensor output which comes from the image sensor may be received in an ISP, when a user operates a camera by performing a camera application, when a face recognition function is used, or when the user makes a video call. When the sensor output is received in the ISP, the electronic device 101 may output the preview on the basis of a frame generated based on the sensor output. In addition, the electronic device 101 may output the preview by persistently updating the frame on the basis of the sensor output.

According to an embodiment, in an operation 1320, a zoom-in or zoom-out operation may be performed. The zoom-in operation may include a digital zoom-in operation. The digital zoom-in operation may include displaying an image by enlarging the image through signal processing for an image according to a user's input. The zoom-out operation may include a digital zoom-out operation. The digital zoom-out operation may include displaying an image by reducing the image through signal processing for an image according to a user's input. For example, the electronic device (e.g., the electronic device 101 of FIG. 1, the electronic device 310 of FIG. 3) may include the digital zoom-in or zoom-out operation in which a user touches the display device 160 (e.g., a touchscreen display) to enlarge or reduce a screen. Alternatively, it is possible to include an operation in which the user selects a zoom magnification indication on the screen to enlarge or reduce the screen.

According to an embodiment, in an operation 1330, the electronic device (e.g., the electronic device 101 of FIG. 1, the electronic device 310 of FIG. 3) may determine an illuminate value for the image generated through the image sensor 230. For example, the determining of the illuminance value by the electronic device 101 may include acquiring a brightness value of an image which is currently viewed through an internal arithmetic operation by using a region of the display device 160 (e.g., the display 330). The electronic device (e.g., the electronic device 101 of FIG. 1, the electronic device 310 of FIG. 3) may acquire the illuminance value of the image currently viewed and a zoom magnification value which is set by the user, in a process of performing auto exposure, through the internal arithmetic operation. Herein, the arithmetic operation may include acquiring specific data through an algorithm of each module with an image which comes from an output of a sensor.

According to an embodiment, in an operation 1340, the electronic device (e.g., the electronic device 101 of FIG. 1, the electronic device 310 of FIG. 3) may determine whether an illuminance value for the image generated through the image sensor 230 is greater than or equal to a first value. The illuminance value may be at least one condition of changing the sensor mode. In the operation 1340, if the illuminance value for the image is greater than or equal to the first value, the electronic device 101 may perform an operation 1350, and otherwise, may perform an operation 1370.

According to an embodiment, in the operation 1350, the electronic device (e.g., the electronic device 101 of FIG. 1, the electronic device 310 of FIG. 3) may determine whether a zoom magnification for the image generated through the image sensor 230 is changed from a value less than a second value to a value greater than or equal to the second value. For example, the changing of the zoom magnification from the value less than the second value to the value greater than or equal to the second value may include changing the zoom magnification from the magnification less than 2.0× to the magnification greater than or equal to 2.0×. The second value of the zoom magnification may be at least one condition of changing the sensor mode. In the operation 1350, if the magnification for the image is changed from a value less than the second value to a value greater than or equal to the second value, the electronic device 101 may perform an operation 1360, and otherwise, may perform the operation 1370.

According to an embodiment, in the operation 1360, the electronic device (e.g., the electronic device 101 of FIG. 1, the electronic device 310 of FIG. 3) may determine that it is necessary to change the output mode of the image sensor 230. Upon determining that the change is necessary, an operation for changing the output mode of the image sensor (e.g., the operations 540 to 570 of FIG. 5, the operations 930 to 960 of FIG. 9, the operation 1230 of FIG. 12) and an operation based on the changing of the output mode of the image sensor (e.g., the operation 1410 to 1460 of FIG. 13) may be performed. For example, upon determining that it is necessary to change the output mode of the image sensor 230, the electronic device (e.g., the electronic device 101 of FIG. 1, the electronic device 310 of FIG. 3) may perform at least one of a process of skipping an update of an image frame, a process of deactivating a module or function of the electronic device (e.g., the electronic device 101 of FIG. 1, the electronic device 310 of FIG. 3) to generate a preview, and a process of changing a sensor index, changing a tuning parameter, and adjusting a screen ratio.

According to an embodiment, in the operation 1370, the electronic device (e.g., the electronic device 101 of FIG. 1, the electronic device 310 of FIG. 3) may finish displaying of the image. For example, the electronic device (e.g., the electronic device 101 of FIG. 1, the electronic device 310 of FIG. 3) may finish the displaying of the image when discharged, when a camera is turned off, when entering an album while operating the camera, when switching to a front camera mode while using a rear camera, and when switching to a rear camera mode while using the front camera mode. The operation 1370 may correspond to the operations 580, 860, 970, and 1250. Upon determining to finish the displaying of the image in the operation 1370, the electronic device 101 finishes the displaying of the image, and otherwise, may perform the operation 1310. When the operation 1370 is performed, the aforementioned process 1300 may be repeated by performing the operation 1310.

FIG. 14 illustrates a flowchart 1400 illustrating a process of updating a frame of a preview image according to various embodiments.

According to an embodiment, in an operation 1410, the electronic device 101 may change an output mode of the image sensor 230. The operation 1410 may be associated with FIG. 9, and may be performed after the operations 920 to 950 of FIG. 9. In addition, the operation 1410 may correspond to the operation 960 of FIG. 9. The operation 970 of FIG. 9 may be performed after operations 1420 to 1460 are performed. The operation 1410 may be performed in association with a case where it is necessary to change an output mode of an image sensor in the operation 1220 of FIG. 12. For example, when the output mode of the sensor is changed, a process of changing a parameter such as a sensor index or the like may be performed in response to a process of skipping an update of a frame of a preview image and a process of deactivating a module or function of the electronic device to generate a preview.

According to an embodiment, in the operation 1420, the electronic device (e.g., the electronic device 101 of FIG. 1, the electronic device 310 of FIG. 3) may include an operation of changing a sensor index. The operation 1420 may correspond to the operation 570 of FIG. 5. According to an embodiment, the sensor index may be a variable used when accessing information on a sensor mode currently used in each module. In addition, the sensor index may be used when an output size, driving Frames Per Second (FPS), or the like of the current sensor mode is acquired, and may indicate an order by which each sensor mode is defined.

According to an embodiment, in the operation 1430, the electronic device (e.g., the electronic device 101 of FIG. 1, the electronic device 310 of FIG. 3) may use the sensor index to have access to the information on the sensor mode currently in use. For example, the electronic device (e.g., the electronic device 101 of FIG. 1, the electronic device 310 of FIG. 3) may use the sensor index to acquire an output size, driving FPS, or the like which is the information on the sensor mode.

According to an embodiment, in the operation 1440, the electronic device (e.g., the electronic device 101 of FIG. 1, the electronic device 310 of FIG. 3) may change a tuning parameter in accordance with the information on the sensor mode. Since a tuning parameter feature is different for each camera and image sensor 230, the camera and the image sensor may have different respective setting files. For example, the setting file may consist of at least a setting file for a portion which determines image quality of the camera, such as brightness, color, noise, details, shading, or the like.

According to an embodiment, in the operation 1450, the electronic device (e.g., the electronic device 101 of FIG. 1, the electronic device 310 of FIG. 3) may adjust a screen ratio in accordance with the information on the sensor mode. For example, the electronic device (e.g., the electronic device 101 of FIG. 1, the electronic device 310 of FIG. 3) may adjust the screen ratio in accordance with the output size of the sensor mode.

According to an embodiment, in the operation 1460, the electronic device (e.g., the electronic device 101 of FIG. 1, the electronic device 310 of FIG. 3) may apply a setting file in association with the changed sensor mode. For example, the electronic device 101 may apply the changed sensor index, the changed tuning parameter, and the screen ratio to a frame of a preview image.

According to an embodiment, in an operation 1470, the electronic device (e.g., the electronic device 101 of FIG. 1, the electronic device 310 of FIG. 3) may update the frame of the preview image. When the frame of the preview image is updated, an image to which each changed setting value is applied may be viewed in the preview. The electronic device (e.g., the electronic device 101 of FIG. 1, the electronic device 310 of FIG. 3) may display or update the preview image including an image generated from information acquired through the image sensor 230. For example, a sensor output which comes from the image sensor may be received in an ISP, when a user operates a camera by performing a camera application, when a face recognition function is used, or when the user makes a video call. When the sensor output is received in the ISP, the electronic device 101 may output the preview on the basis of a frame generated based on the sensor output. In addition, the electronic device 101 may output the preview by persistently updating the frame on the basis of the sensor output. According to an embodiment, although the post-processing performed in the conventional stream-on/off process includes the changing of the sensor index, the changing of the tuning parameter, and the adjusting of the screen ratio, the post-processing may be performed additionally while skipping the stream-on/off process, so that the frame of the preview image is updated by applying the operation 1050, not the operation 1040 of FIG. 10, as the post-processing in the operation 1020 of FIG. 10 due to a timing to be applied in practice.

Methods based on the embodiments disclosed in the claims and/or specification of the disclosure can be implemented in hardware, software, or a combination of both.

When implemented in software, computer readable recording medium for storing one or more programs (i.e., software modules) can be provided. The one or more programs stored in the computer readable recording medium are configured for execution performed by one or more processors in the electronic device. The one or more programs include instructions for allowing the electronic device to execute the methods based on the embodiments disclosed in the claims and/or specification of the disclosure.

The program (i.e., the software module or software) can be stored in a random access memory, a non-volatile memory including a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs) or other forms of optical storage devices, and a magnetic cassette. Alternatively, the program can be stored in a memory configured in combination of all or some of these storage media. In addition, the configured memory can be plural in number.

Further, the program can be stored in an attachable storage device capable of accessing the electronic device through a communication network such as the Internet, an Intranet, a Local Area Network (LAN), a Wide LAN (WLAN), or a Storage Area Network (SAN) or a communication network configured by combining the networks. The storage device can have access to a device for performing an embodiment of the disclosure via an external port. In addition, an additional storage device on a communication network can have access to the device for performing the embodiment of the disclosure.

In the aforementioned specific embodiments of the disclosure, a component included in the disclosure is expressed in a singular or plural form according to the specific embodiment proposed herein. However, the singular or plural expression is selected properly for a situation proposed for the convenience of explanation, and thus the various embodiments of the disclosure are not limited to a single or a plurality of components. Therefore, a component expressed in a plural form can also be expressed in a singular form, or vice versa.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
   a display;
   an image sensor; and
   at least one processor,
   wherein the at least one processor is configured to:
      display a preview image including an image generated from information acquired through the image sensor;
      perform a zoom-in operation or a zoom-out operation for the preview image;
      determine whether to change an output mode of the image sensor in response to the zoom-in operation or the zoom-out operation;
      in response to determining to change the output mode of the image sensor and skip an update of a second frame that is at least one of frames next to a first frame that is a frame of the preview image corresponding to a timing of determining to change the output mode of the image sensor, generate an inter-integrated circuit (I2C) instruction to change the output mode of the image sensor;
      control the image sensor to change the output mode of the image sensor by executing the generated I2C instruction while the image sensor maintains an active state; and
      in response to the change of the output mode, change a sensor index recorded in a register to have access to information on a sensor mode currently in use.

2. The electronic device of claim 1, wherein the executing of the I2C instruction is complete within a duration that the second frame is not updated.

3. The electronic device of claim 2, wherein the at least one processor is further configured to:
   while skipping the update of the second frame, based on the changed sensor index, change a screen ratio of an image acquired through the image sensor; and
   generate the image with the screen ratio changed.

4. The electronic device of claim 2, wherein the at least one processor is further configured to:
   generate the image through a tuning parameter corresponding to the changed sensor index while skipping the update of the frame of the preview image.

5. The electronic device of claim 2, wherein the at least one processor is further configured to:
   determine a switch frame identifier (ID) in response to determining to change the output mode; and
   skip the update of the frame of the preview image, in response to a current frame identifier for the preview image corresponding to the switch frame identifier.

6. The electronic device of claim 2, wherein the at least one processor is further configured to:
   deactivate at least one of an exposure adjustment function, an auto white balance function, and an auto focus function, in response to determining to change the output mode of the image sensor.

7. The electronic device of claim 1, wherein the at least one processor is further configured to:
   determine an illuminance value for the image generated through the image sensor; and
   determine whether to change the output mode of the image sensor, based on the illuminance value for the image.

8. The electronic device of claim 7, wherein the at least one processor is further configured to:
   in response to the determined illuminance value being greater than or equal to a first value and a zoom magnification for the preview image being changed from a value less than a second value to a value greater than or equal to the second value by the zoom-in operation, determine to change the output mode of the image sensor.

9. The electronic device of claim 2, wherein the at least one processor is further configured to:
   update for a fourth frame that is a frame next to a third frame corresponding to a timing that the executing of the I2C instruction is complete, in response to the executing of the I2C instruction being complete within the duration that the frame is not updated.

10. The electronic device of claim 9, wherein the at least one processor is further configured to:
    update the fourth frame to the image generated based on a signal output from the image sensor.

11. The electronic device of claim 1, wherein the change of the output mode is a change from a mode with four filters with the same color are arranged in four cells of the image sensor to output values acquired through the four cells to a mode that arrays of cell values acquired by re-arranging the four cells are re-arranged by using a re-mosaic algorithm.

12. A method of controlling an electronic device, the method comprising:
- displaying a preview image including an image generated from information acquired through an image sensor of the electronic device;
- performing a zoom-in operation or a zoom-out operation for the preview image;
- determining whether to change an output mode of the image sensor in response to the zoom-in operation or the zoom-out operation;
- in response to determining to change the output mode of the image sensor, generating an inter-integrated circuit (I2C) instruction to change the output mode of the image sensor and skipping an update of a second frame that is at least one of frames next to a first frame that is a frame of the preview image corresponding to a timing of determining to change the output mode of the image sensor;
- executing the generated I2C instruction while the image sensor maintains an active state;
- controlling the image sensor to change the output mode of the image sensor by executing the generated I2C instruction; and
- in response to the change of the output mode, changing a sensor index recorded in a register to have access to information on a sensor mode currently in use.

13. The method of claim 12,
wherein the executing of the I2C instruction is complete within a duration that the second frame is not updated.

14. The method of claim 13, wherein the displaying of the preview image comprises:
while skipping the update of the second frame, based on the changed sensor index, changing a screen ratio of an image acquired through the image sensor; and
generating the image with the screen ratio changed.

15. The method of claim 13, further comprising:
generating the image through a tuning parameter corresponding to the changed sensor index while skipping the update of the frame of the preview image.

16. The method of claim 13, further comprising:
determining a switch frame identifier in response to determining to change the output mode; and
skipping the update of the frame of the preview image, in response to a current frame identifier for the preview image corresponding to the switch frame identifier.

17. The method of claim 13, further comprising:
deactivating at least one of an exposure adjustment function, an auto white balance function, and an auto focus function, in response to determining to change the output mode of the image sensor.

18. The method of claim 12, further comprising:
determining an illuminance value for the image generated through the image sensor; and
in response to the determined illuminance value being greater than or equal to a first value and a zoom magnification for the preview image being changed from a value less than a second value to a value greater than or equal to the second value by the zoom-in operation, determining to change the output mode of the image sensor.

19. The method of claim 13, further comprising:
updating a fourth frame that is a frame next to a third frame corresponding to a timing at which the executing of the I2C instruction is complete, in response to the executing of the I2C instruction being complete within the duration that the frame is not updated.

20. The method of claim 19, further comprising:
updating the fourth frame to the image generated based on a signal output from the image sensor.

\* \* \* \* \*